(12) United States Patent
Bodendorf et al.

(10) Patent No.: US 11,332,941 B2
(45) Date of Patent: May 17, 2022

(54) DEVICE AND METHODS FOR MAKING A STAIR TREAD AND A MOLDED CURVED STAIR TREAD

(71) Applicant: Mannington Mills, Inc., Salem, NJ (US)

(72) Inventors: Keith Bodendorf, Medford, NJ (US); Dennis H. Bradway, Salem, NJ (US); Joseph F. Finlaw, Pennsville, NJ (US)

(73) Assignee: MANNINGTON MILLS, INC., Salem, NJ (US)

( * ) Notice: Subject to any disclaimer, the term of this patent is extended or adjusted under 35 U.S.C. 154(b) by 172 days.

(21) Appl. No.: 16/908,766

(22) Filed: Jun. 23, 2020

(65) Prior Publication Data
US 2021/0010272 A1 Jan. 14, 2021

Related U.S. Application Data

(60) Provisional application No. 62/872,049, filed on Jul. 9, 2019.

(51) Int. Cl.
*B29C 70/54* (2006.01)
*B29C 70/72* (2006.01)
(Continued)

(52) U.S. Cl.
CPC .......... *E04F 11/163* (2013.01); *B29C 70/541* (2013.01); *B29C 70/682* (2013.01);
(Continued)

(58) Field of Classification Search
CPC ..... B29C 70/541; B29C 70/72; B29C 70/682; B29C 53/04; E04F 11/166
(Continued)

(56) References Cited

U.S. PATENT DOCUMENTS 2,484,947 A   10/1949  Hocutt
4,078,962 A *  3/1978  Krueger .............. B32B 37/1018
                                                    156/286
(Continued)

FOREIGN PATENT DOCUMENTS

CN      104234337 A    12/2014
JP      11-181984 A     7/1999

OTHER PUBLICATIONS

GuruBrew, Homemade Plastic Bending Machine—Bend-O-Matic 1000, < https://www.youtube.com/watch?v=O6qXcOf-cCo>, Available Sep. 10, 2016 (Year: 2016).*

(Continued)

*Primary Examiner* — Matthew J Daniels
*Assistant Examiner* — Hana C Page
(74) *Attorney, Agent, or Firm* — Kilyk & Bowersox, P.L.L.C.

(57) ABSTRACT

A device for making a molded stair tread is described. The device can have: a base; a pivoting assembly; a molding template connected to the pivoting assembly; a holding device connected to the molding template, the holding device having a clamp jaw and a pivot configured to rotate the holding device relative to the molding template; and a locking mechanism configured to hold the molding template and the holding device in an open configuration such that the holding device can accept a first part of the plastic sheet and configured to release the molding template and the holding device such that the holding device is in a securing configuration that secures, via the clamp jaw, the first part of the plastic sheet to the first side of the molding template at the first longitudinal edge of the molding template. Methods for making the stair tread are described as well as the molded stair tread.

15 Claims, 17 Drawing Sheets

(51) Int. Cl.
  *B29C 70/68* (2006.01)
  *E04F 11/16* (2006.01)
  *E04F 11/104* (2006.01)
  *E04F 11/108* (2006.01)

(52) U.S. Cl.
  CPC ............ *B29C 70/72* (2013.01); *E04F 11/108* (2013.01); *E04F 11/1045* (2013.01)

(58) Field of Classification Search
  USPC ........................................................ 264/239
  See application file for complete search history.

(56) References Cited

U.S. PATENT DOCUMENTS

| | | | |
|---|---|---|---|
| 5,475,951 | A | 12/1995 | Litzow |
| 6,082,061 | A | 7/2000 | Ryan |
| 6,115,975 | A | 9/2000 | Abdollah |
| 8,534,009 | B2 | 9/2013 | Kay |
| 8,936,057 | B2 * | 1/2015 | Sampica ............. B32B 37/1009 156/286 |
| 2003/0215607 | A1 | 11/2003 | Horwitz |
| 2005/0260387 | A1 | 11/2005 | Lux |
| 2006/0272230 | A1 | 12/2006 | Elwood |
| 2007/0044398 | A1 | 3/2007 | Skopis |
| 2008/0005988 | A1 | 1/2008 | Dombowsky |
| 2010/0146879 | A1 | 7/2010 | Chin |
| 2011/0146168 | A1 | 6/2011 | van Genderen |
| 2011/0162302 | A1 | 7/2011 | Barrett |
| 2013/0061543 | A1 | 3/2013 | Council |
| 2020/0346482 | A1 * | 11/2020 | Mendez .............. E04F 15/0215 |

OTHER PUBLICATIONS

"Shannon Acrylic Automatic Plastic Bending Machine ABM-D 135," Available Apr. 16, 2019, < https://www.youtube.com/watch?v=2A4rAlbuJ4g> (Year: 2019).*
Les Wilhelm, "Bending Polycarbonate" Available Dec. 15, 2013, < https://www.youtube.com/watch?v=sNWqbAz6Lww> (Year: 2013).*
www.homedepot.com/p/Cap-A-Tread-Brazilian-Cherry-47-in-Long-x-12-1-8-in-Deep-x-1-11-16-in-Height-Vinyl-to-Cover-Stairs-1-in-Thick-0160735642-3980115 (2018).
http://sixdegreesflooring.com/impression/ (pp. 1-7)(2018).

* cited by examiner

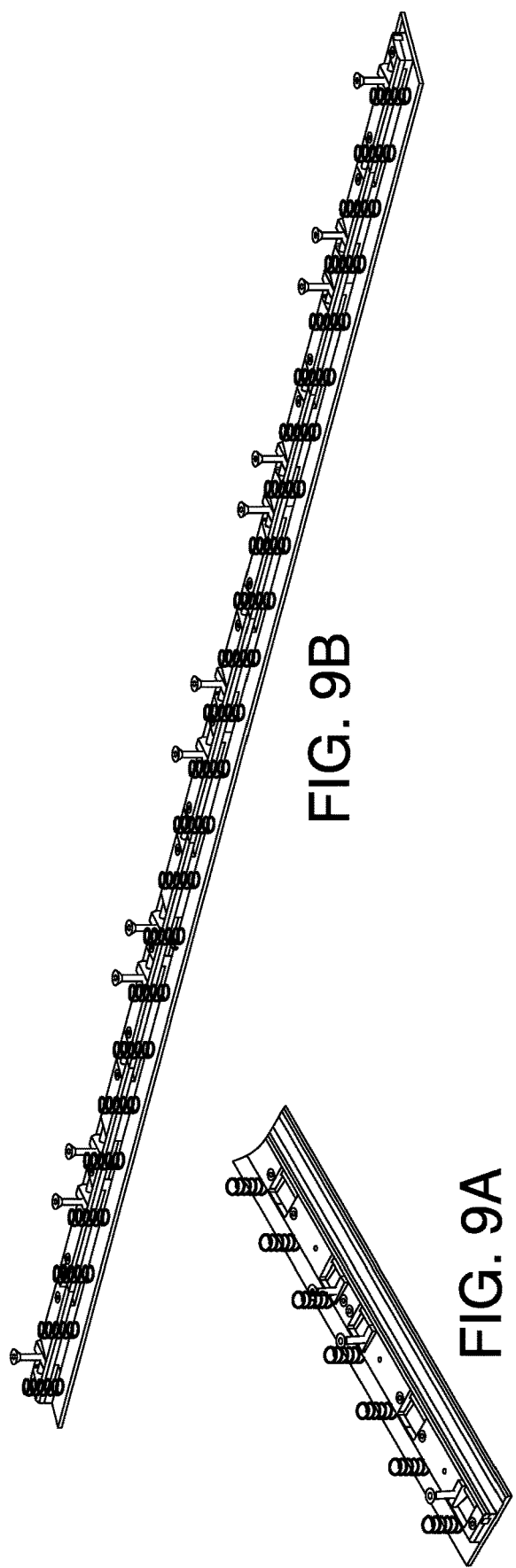
FIG. 9B
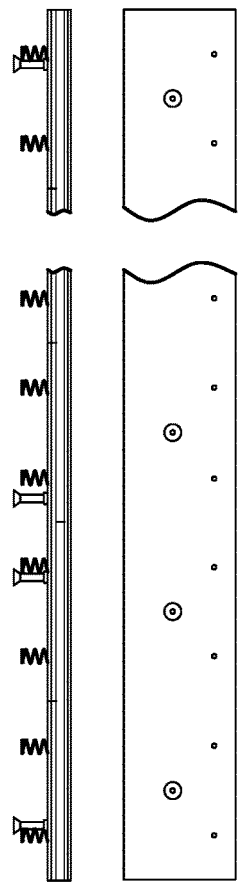
FIG. 9D
FIG. 9A
FIG. 9E
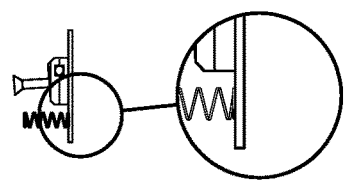
FIG. 9C

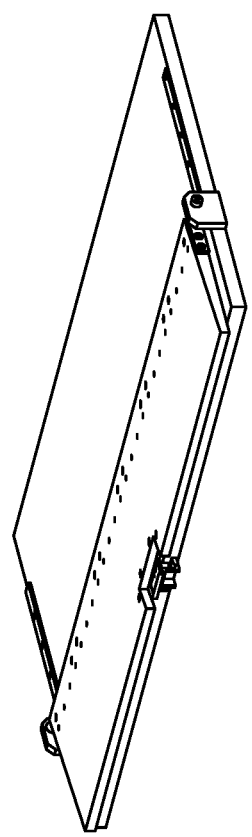
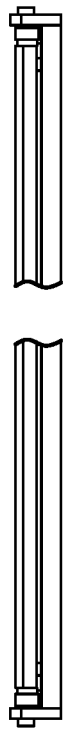
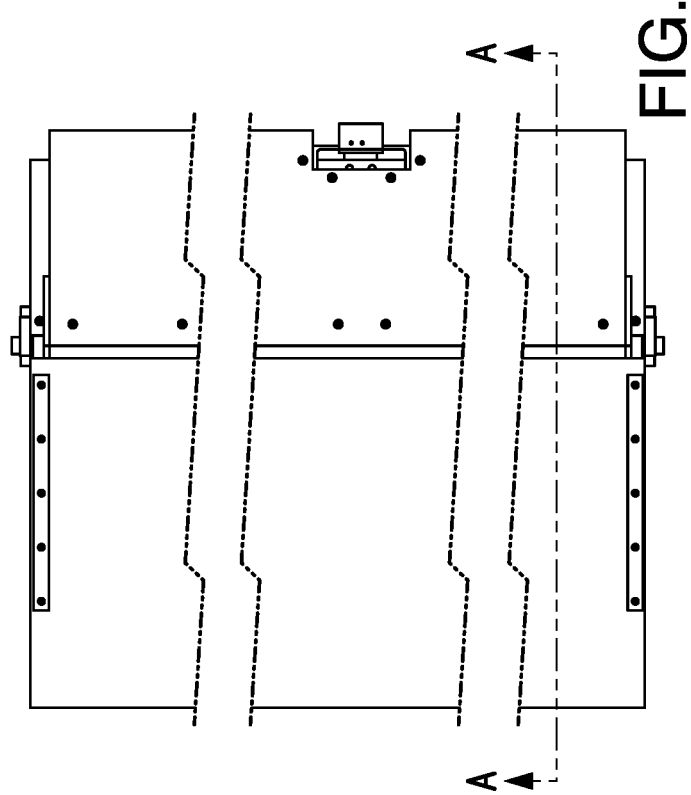
FIG. 11B
FIG. 11D
FIG. 11A
FIG. 11C

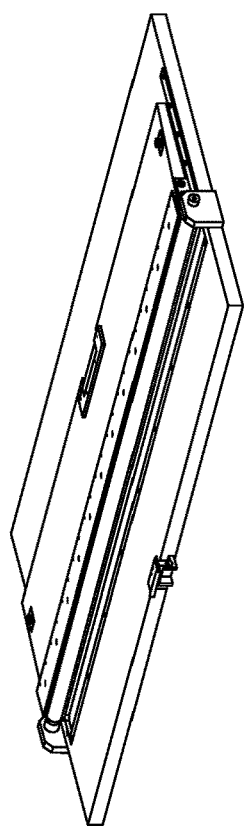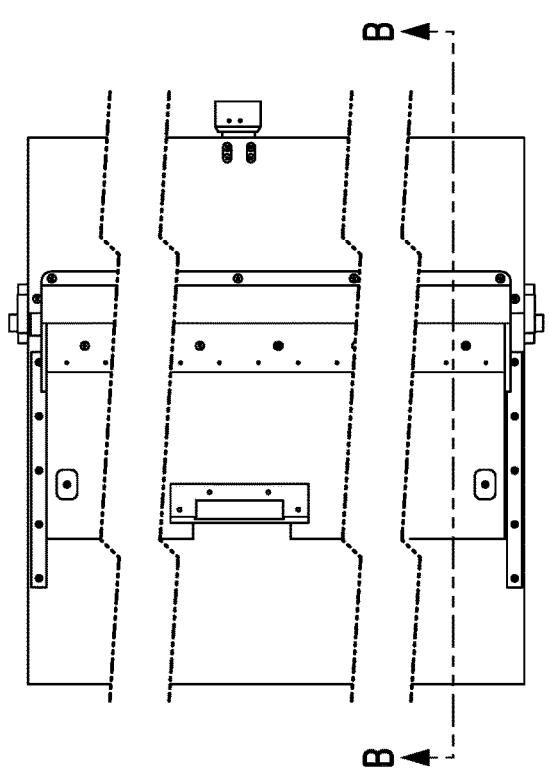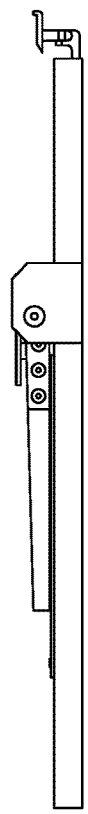
FIG. 13B
FIG. 13D
FIG. 13A
FIG. 13C

DEVICE AND METHODS FOR MAKING A STAIR TREAD AND A MOLDED CURVED STAIR TREAD

This application claims the benefit under 35 U.S.C. § 119(e) of prior U.S. Provisional Patent Application No. 62/872,049, filed Jul. 9, 2019, which is incorporated in its entirety by reference herein.

BACKGROUND OF THE INVENTION

The present invention relates to a device, methods for making a stair tread, and a molded stair tread with a curved feature or bull nosing.

Wood treads are a common feature of stairways found in contemporary domestic and commercial buildings. These treads can be worn over time and a renovation may be necessary. Rather than demolishing parts or all of the stairways, it may be desirable to cover a wooden tread with a stair tread, which can be a plastic stair tread, that covers the wood tread. The wood treads described also require staining, painting and/or a clear coating as a protective surface to make it visually desirable and durable. Also, in new construction or renovation, it is desirable to have a faster way to install the stair treads over the traditional method of wood finishing. Carpet is also often used to cover stairs but wears out and needs replacing in short time typically. A stair tread that is more durable, that can match flooring located nearby, and requires less maintenance would be desirable.

Also, a one-piece stair tread that includes the flat surface walked on and that includes the bull nosing section of the stair in the same piece would be desirable especially for a stair tread made of polymeric material.

There is a need for a device that can mold a stair tread (made from a polymer material) in a consistent manner so that the size and dimensions of the stair tread are consistent. There is also a need for a stair tread that has an upward angle at the end/edge of the bull nosing cover that covers the curved nose part of the stair. This slight angle allows the stair tread to firmly grip the stair and can conceal an edge of the stair tread from sight as one walks on the stairs. The inventors have surprisingly found that the device of the present invention meets these needs.

SUMMARY OF THE INVENTION

A feature of the present invention is to provide a device for making a stair tread.

Another feature of the present invention is a method for making a stair tread, where the method can use the device of the present invention.

A further feature is to provide a molded stair tread that includes a bull nosing feature as part of the stair tread (as one piece).

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention relates to a device for making a stair tread, the device comprising: a base; a first guide rail on a first longitudinal edge of the base; a second guide rail on a second longitudinal edge of the base, the first longitudinal edge and the second longitudinal edge of the base being parallel to each other, and the first guide rail and the second guide rail being configured to accept and align a plastic sheet; a pivoting assembly; a molding template comprising a first side, a second side, a first longitudinal edge, a second longitudinal edge, a first lateral edge, and a second lateral edge, wherein the first longitudinal edge is perpendicularly aligned to each of the first lateral edge and the second lateral edge, wherein the first longitudinal edge is parallel to the second longitudinal edge, and wherein the first longitudinal edge is connected to the pivoting assembly; a holding device connected to the molding template, the holding device comprising a clamp jaw and a pivot configured to rotate the holding device relative to the molding template; and a locking mechanism configured to hold the molding template and the holding device in an open configuration such that the holding device can accept a first part of the plastic sheet and configured to release the molding template and the holding device such that the holding device is in a securing configuration that secures, via the clamp jaw, the first part of the plastic sheet to the first side of the molding template at the first longitudinal edge of the molding template.

To achieve these and other advantages, and in accordance with the purposes of the present invention, as embodied and broadly described herein, the present invention also relates to a method of making a stair tread with the device described herein, the method comprising: aligning a plastic sheet on the base of the device with the holding device using the first guiderail and the second guiderail of the base; inserting the first part of the plastic sheet into a space between the clamp jaw and the first side of the molding template; releasing the locking mechanism to release the molding template and the holding device from the locking mechanism, thereby rotating the molding template about the pivot of the holding device such that the clamp jaw clamps the first part of the plastic sheet to the first side of the molding template; and rotating the molding template 175° to 185° around the first longitudinal edge attached to the pivoting assembly, such that a second part of the plastic sheet contacts the second side of the molding template, thereby forming the stair tread, wherein the plastic sheet is a softened plastic sheet that is softened prior to or during said aligning or is softened prior to said inserting.

To achieve these and other advantages, and in accordance with the purposes of the present invention, as embodied and broadly described herein, the present invention also relates to a method of making a stair tread with a device, the method comprising: aligning a plastic sheet on a base with a holding device using a first guiderail and a second guiderail of the base; inserting a first part of the plastic sheet into a space between a clamp jaw of the holding device and a first side of a molding template; releasing a locking mechanism to release the molding template and the holding device from the locking mechanism, thereby rotating the holding device about a pivot in the holding device such that the clamp jaw clamps the first part of the plastic sheet to the first side of the molding template; and rotating the molding template 175° to 185° around a first longitudinal edge attached to the pivoting assembly, such that a second part of the plastic sheet contacts the second side of the molding template, thereby forming the stair tread, wherein the plastic sheet is a softened plastic sheet that is softened prior to or during said aligning or is softened prior to said inserting.

The present invention further relates to a molded stair tread comprising a molded bull nosing feature and said molded stair tread comprising a flooring material having at least one polymeric backing layer and an optional décor layer and optional wear layer. As an option, the molded stair tread can have one or more of the following properties, as measured by ASTM D1037 3 Point Static Bending:

a Peak Load (lbf) 30 to 100 (e.g., from 40 to 100, or from 50 to 100, or from 60 to 100) and/or a Modulus (ksi) 150 to 1200 (e.g., from 250 to 1200, from 400 to 1200, from 600 to 1200, from 700 to 1100) and/or a Stiffness (kPa) 1,000,000 to 7,000,000 (e.g., from 1,250,000 to 7,000,000, from 2,000,000 to 7,000,000, from 3,000,000 to 7,000,000, from 4,000,000 to 7,000,000, from 5,000,000 to 7,000,000).

It is to be understood that both the foregoing general description and the following detailed description are exemplary and explanatory only and are intended to provide a further explanation of the present invention, as claimed.

The accompanying drawing, which is incorporated in and constitutes a part of this application, illustrate some of the embodiments of the present invention and together with the description, serves to explain the principles of the present invention.

BRIEF DESCRIPTION OF THE DRAWINGS

FIG. 9A is a top perspective view of a short length of spring mechanisms of a holding device according to the present invention.

FIG. 9B top perspective view of a longer length of spring mechanisms of a holding device according to the present invention.

FIG. 9C is a front view with enlarged detail of a single spring mechanism shown in FIG. 9B.

FIG. 9D is a composite front and bottom view of the spring mechanism shown in FIG. 9B.

FIG. 9E is a side view of the profile of the holding device.

FIG. 11A shows a top view of the device, along with details of one example of the device.

FIG. 11B shows is a top, front, end perspective view of the device shown in FIG. 11A in the same configuration, showing the locking mechanism holding the molding template in the open configuration.

FIG. 11C is a side view of the example of the device shown in FIGS. 11A and 11B.

FIG. 11D is a font view of the same example of the device shown in FIGS. 11A-11C.

FIG. 13A shows a top view of a second configuration of another device as described herein.

FIG. 13B is a top, front, end perspective view of the configuration shown in FIG. 13A.

FIG. 13C is a side view of the device shown in FIGS. 13A and 13B.

FIG. 13D is a front view of the same device shown in FIGS. 13A-13C.

DETAILED DESCRIPTION OF THE PRESENT INVENTION

The device for making a stair tread of the present invention, as an option, comprises: a device for making a stair tread, the device comprising: a base; a first guide rail on a first longitudinal edge of the base; a second guide rail on a second longitudinal edge of the base, the first longitudinal edge and the second longitudinal edge of the base being parallel to each other, and the first guide rail and the second guide rail being configured to accept and align a plastic sheet; a pivoting assembly; a molding template comprising a first side, a second side, a first longitudinal edge, a second longitudinal edge, a first lateral edge, and a second lateral edge, wherein the first longitudinal edge is perpendicularly aligned to each of the first lateral edge and the second lateral edge, wherein the first longitudinal edge is parallel to the second longitudinal edge, and wherein the first longitudinal edge is connected to the pivoting assembly; a holding device connected to the molding template, the holding device comprising a clamp jaw and a pivot configured to rotate the holding device relative to the molding template; and a locking mechanism configured to hold the molding template and the holding device in an open configuration such that the holding device can accept a first part of the plastic sheet and configured to release the molding template and the holding device such that the holding device is in a securing configuration that secures the first part of the plastic sheet to the first side of the molding template at the first longitudinal edge of the molding template.

The device can comprise, consist essentially of, consists of, or include, the aforementioned components.

Figure 1A:
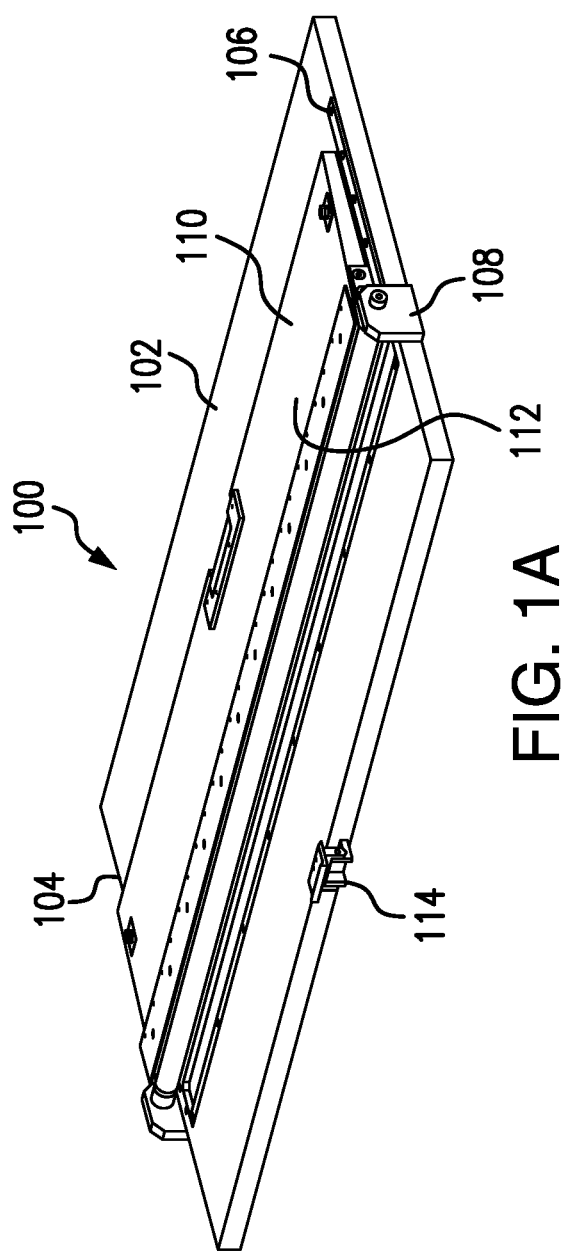
FIG. 1A is a front, right, top perspective view of a device according to an example of the present invention.

An example of the device according to the present invention can be seen in FIG. 1A, which shows a device (100) comprising, consisting of, or including, a base (102), a first guiderail (104), a second guiderail (106), a pivot assembly (108), a molding template (110), a holding device (112), and a locking mechanism (114).

The material used to make base (102) is not critical, or particularly limited, and can be any suitable material, such as, but not limited to, a plywood sheet, a plastic sheet, wood, particle board, medium density fiberboard, a metal sheet such as a steel sheet or an aluminum sheet, kitchen countertop surface material (e.g., stone or synthetic) or any combination thereof. The size of the base is not particularly limited, as long as is it is a sufficient size to support a plastic sheet that is, e.g., from 45 to 55 inches wide and from 10 to 20 inches long. The base can be, e.g., 48 to 60 inches wide and 25 to 35 inches long.

The material used to make first guiderail (104) and second guiderail (106) is not critical, or particularly limited, and can be any suitable material such as wood, metal, and plastic. Each of the first guiderail (104) and the second guiderail (106) are affixed to base (102) by any suitable means or device, such as a nail, a screw, a staple, glue, a pressure sensitive adhesive, or any combination thereof. The first and second guiderails are located on, near, or close to outer edges of base (102). A distance of 45 to 50 inches (e.g. 48 inches) or other distance separates the first and second guiderails. The first and second guiderails are parallel in alignment, where, as used herein, the term "parallel," includes, but is not limited to, a perfect or close parallel alignment of the two guiderails. The guiderails may be 5° or less off of perfect parallel. The guiderails must be sufficiently parallel to accept and align a plastic sheet described herein.

The device of the present invention comprises or includes a molding template (110). FIG. 1B is a side view of one example of a molding template (110), which has a first side (116), a second side (118), a first longitudinal edge (120), and a second longitudinal edge (122). A first lateral edge is seen as the face of the cross-sectional view, and a second lateral edge can be seen as the opposite edge in FIG. 1A. This template can be in a rectangular shape, for example, having: i) a width of 45 to 50 inches or other widths below or above this range, preferably from 46 to 49 inches, e.g. 48 inches; ii) a depth of 8 to 15 inches or other depths above or below this range, preferably 10 to 12 inches, e.g. 11.5 inches; and iii) a height of 0.5 to 2 inches or more, such as 0.5 to 1.75 inches, or 0.5 to 1.5 inches, 0.8 to 1.2 inches, e.g. 1.0 inch. Preferably, the molding template has or includes the form of a stair tread, e.g., a width of 48 inches, a depth of 11.5 inches, and a height of 1.0 inch, though other widths, depths, and/or heights are all possible depending on the stair/step's dimensions. As defined herein, the width of the molding template is defined as the distance between first lateral edge and second lateral edge; the depth is defined as the distance between the first longitudinal edge (e.g. 120) and the second longitudinal edge (e.g. 122); the height is defined as the distance between the first side (e.g. 116) and the second side (e.g. 118). The molding template can be an actual stair tread (e.g. wooden or other material), or be a material having the shape and dimensions of a stair tread, or an approximation of a stair tread and made of any suitable material for working with plastic sheets.

Figure 1C:
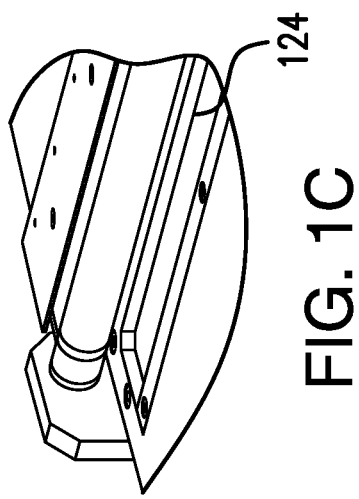
FIG. 1C is an enlarged partial view of the device of FIG. 1A showing a recess according to an example of the present invention.
Figure 1B:
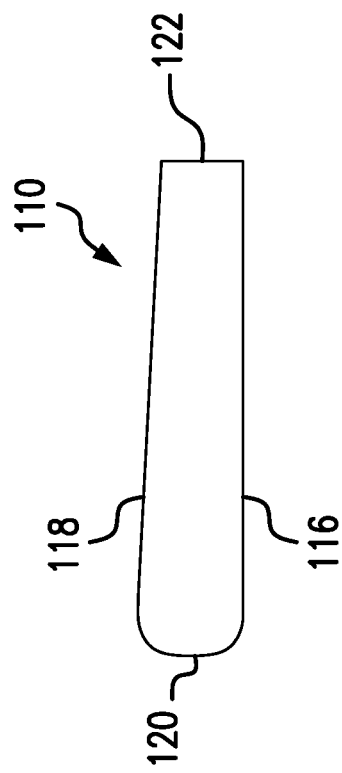
FIG. 1B is a side view of a molding template of the device according to an example of the present invention.

FIG. 1C shows an enlarged partial view of an example of the device where a recess (124) is present in base (102). The holding device can, in one configuration of the device, rest partially or completely in the recess. The dimensions of the recess are not particularly limited, so long as the recess can receive at least part of the holding device in this configuration. Preferably, the recess is 0.6 to 0.8 inches in depth, preferably 0.6 to 0.7 inches in depth, e.g. 0.625 inches in depth. The recess can also be 0.4 to 1 inch wide (or other amounts) and 45 to 50 inches wide (or other amounts).

Figure 2:
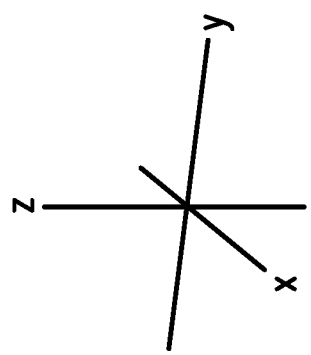
FIG. 2 is a side view of another molding template according to an example of the present invention and indicates a distance in a thickness direction of the molding template.
Figure 2:
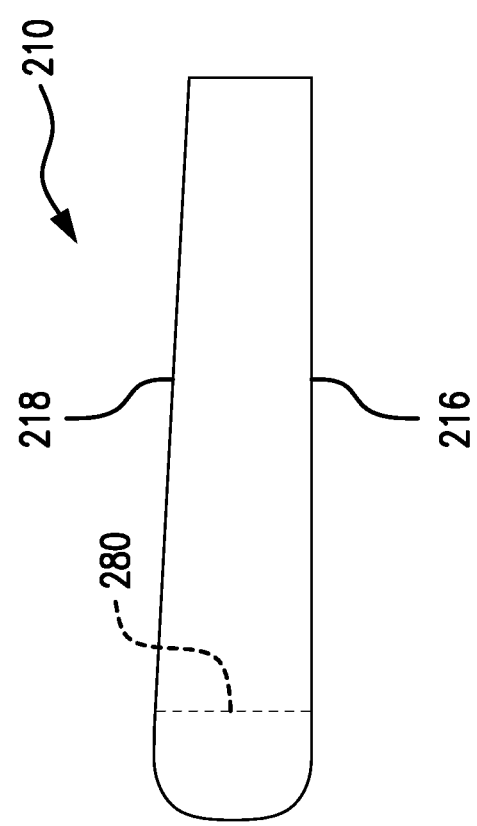

FIG. 2 is a side view of another example (210) of a molding template (110). In this example, as seen in this figure, the molding template has a thickness (280—dashed line) as defined by a distance between first side (216) and second side (218) in a thickness direction of the molding template. In this example, the thickness direction is defined as the Z-Z axis of the molding template.

Figure 3:
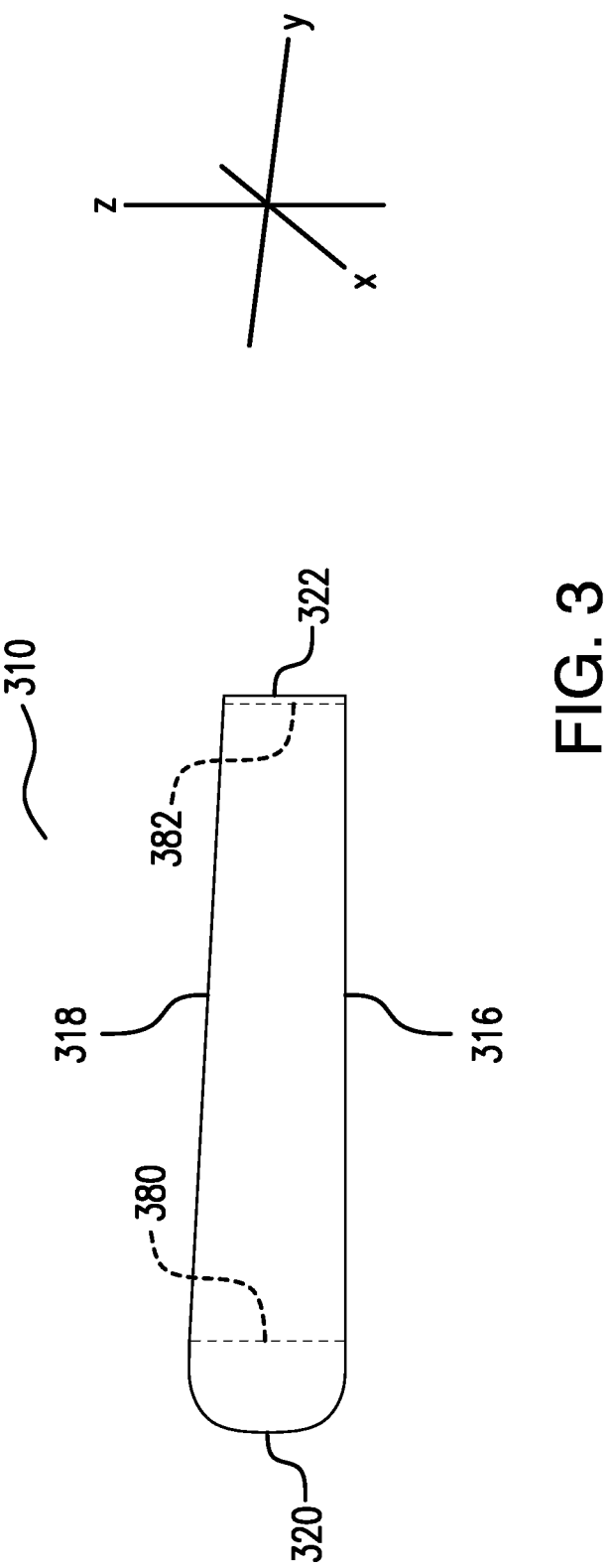
FIG. 3 is a side view of another molding template according to an example of the present invention and indicates two distances in a thickness direction of the molding template.

FIG. 3 is a side view of yet another example (310) of a molding template (110). In this example, as seen in this figure, the molding template has a first thickness (dashed line 380) as defined by a distance between first side (316) and second side (318) in a thickness direction of the molding template at the first longitudinal edge (320). The molding template also has a second thickness (dashed line 382) as defined by a distance between first side (316) and second side (318) in a thickness direction of the molding template at the second longitudinal edge (322). In this example, the thickness direction is defined as the Z-Z axis of the molding template. The first thickness and the second thickness can be the same thickness, or the first thickness and the second thickness can be different thicknesses, thereby forming a slope to the first side (316) and/or a slope to the second side (318).

With the molding template, at least one edge of the longitudinal edges are rounded or have a rounded feature. This provides a rounded edge to the plastic sheet upon molding so as to form and mimic the bull nosing of the stair. The longitudinal edge of the molding template that forms the molded edge of the stair tread is not rectangular.

Figure 4:
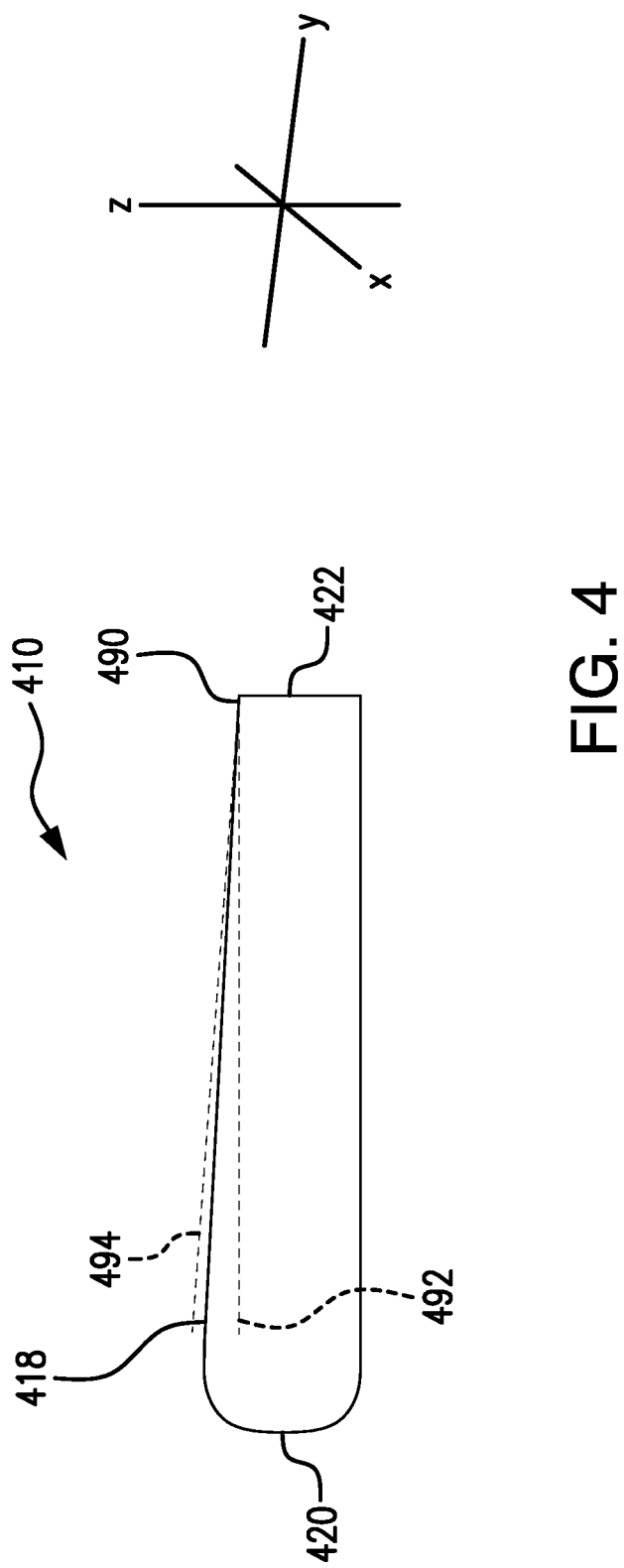
FIG. 4 is a side view of another molding template according to an example of the present invention and shows an angle of one side of the molding template.

FIG. 4 is a side view showing another example (410) of a molding template (110). In this example, an angle is defined by: i) a first projected line (dashed line 492) that is perpendicular to second longitudinal edge (422) and connects first longitudinal edge (420) to the top-most point (490) of second longitudinal edge (422); and ii) a second projected line (dashed line 494) that connects the top most point (490) of second longitudinal edge (422) to a top-most point (496) of second side (418). This angle is, as an example, 0.5° to 8°, preferably 1° to 5°, most preferably 1° to 3°, e.g. (about) 2°. In a stair tread formed with this molding template, the stair tread has a rounded end and a surface extended from this rounded end, and the surface extends at a downward angle of, e.g., 0.5° to 8°, preferably 1° to 5°, most preferably 1° to 3°, e.g. (about) 2°, and assists in forming a tight fit between the stair tread and the stair on which the stair tread is placed and attached.

Figure 5:
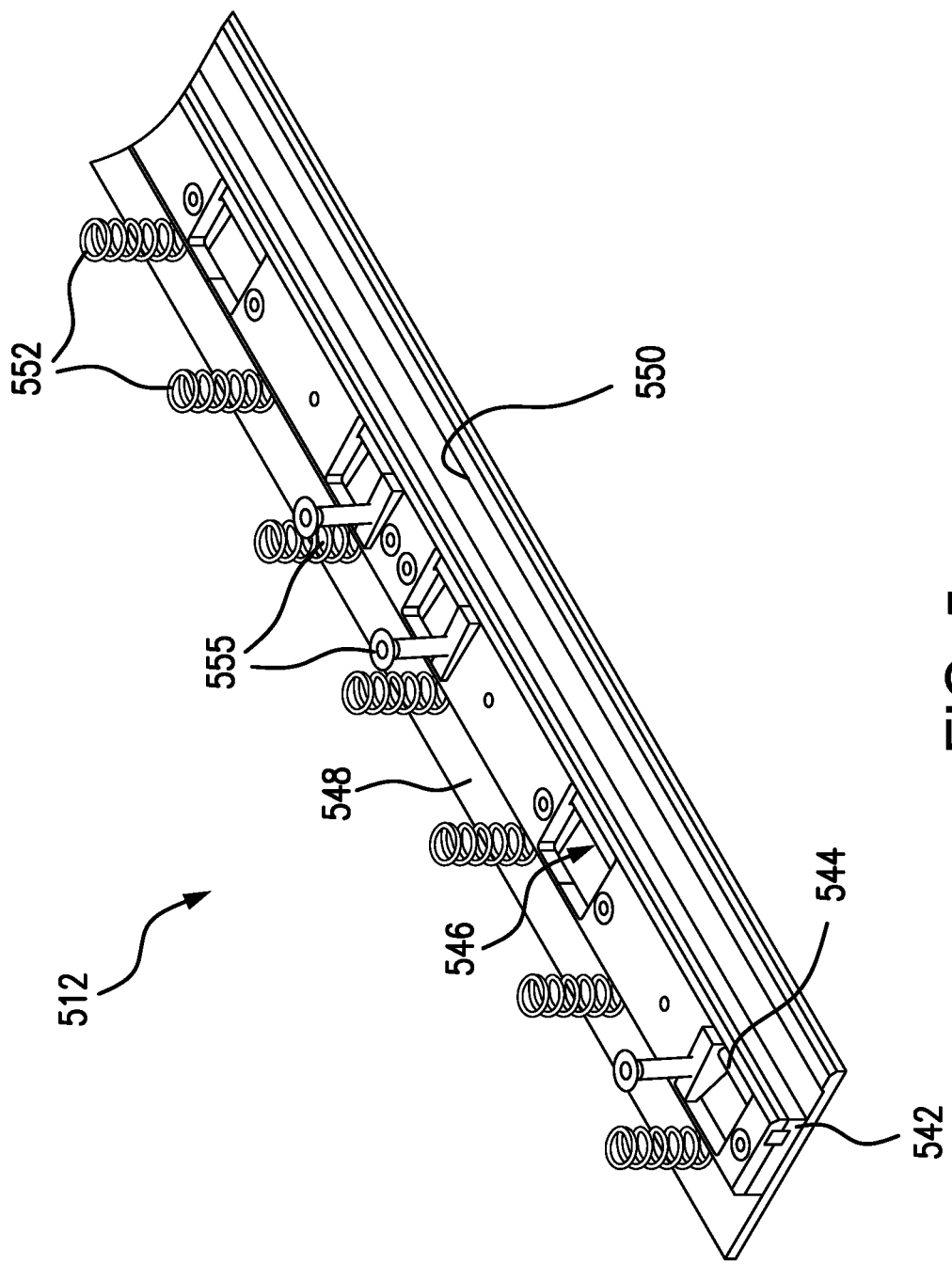
FIG. 5 is a top perspective view of a holding device according to an example of the present invention.

FIG. 5 is a top perspective view showing an example of the holding device of the present invention. In this example, the holding device (512) has a pivot base (542), a pivot axle (544), a pivot (546), a clamp plate (548), a clamp jaw (550), a plurality of springs (552), and a plurality of attachment means (554). The material used to make any of pivot base (542), pivot axle (544), pivot (546), clamp plate (548), clamp jaw (550), plurality of springs (552), and plurality of attachment means (554) is not particularly limited, and can be plastic, metal, wood, or any combination thereof. As seen in FIG. 5, pivot base (542), pivot axle (544), pivot (546), and the plurality of springs (552) are all attached to clamp plate (548). Preferably, the plurality of springs are all attached to clamp plate (548) at one end of each spring. The other end of each spring is, e.g., attached to molding template (110). Each spring can be attached to clamp plate (548) and molding template (110). The plurality of attachment means (554) attaches the holding device (512 or 112 in FIG. 1) to the molding template (110), and can be, for example, any of a screw, glue, and a nail. In FIG. 5, the plurality of attachment means is seen as a plurality of screws, which can be attached to the pivot (546).

Figure 6B:
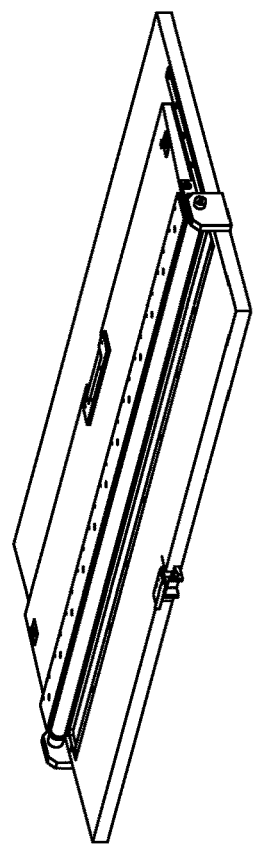
FIGS. 6A and 6B show the rotation of a molding template about the pivoting assembly in an example of the present invention.
Figure 6A:
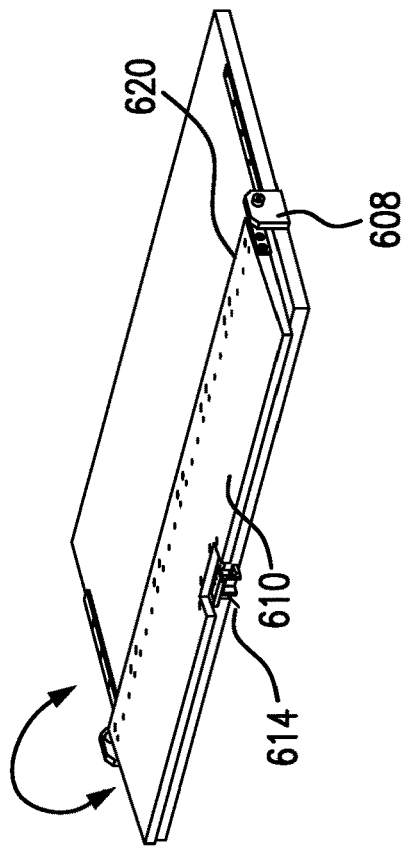

FIGS. 6A and 6B show two exemplary configurations of device (100) of the present invention. In FIG. 6A, a configuration is shown where the molding template (610) is secured by locking mechanism (614). FIG. 6B shows a configuration where the molding template is released from locking mechanism (614) and is rotated 175° to 185°, e.g. (about) 180°, around the first longitudinal edge (620), where this rotation is caused by rotation of an arm of pivoting assembly (608) attached to the first longitudinal edge (620) of the molding template (610). The curved double arrow shows the way in which the device switches between the two configurations.

Figure 7B:
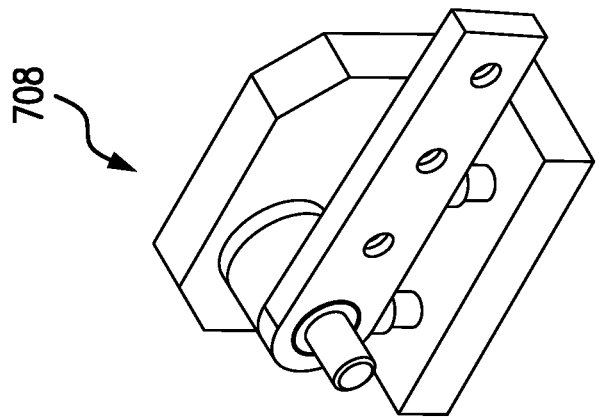
FIG. 7B is an assembled view of the pivoting assembly shown in FIG. 7A, according to an example of the present invention.
Figure 7A:
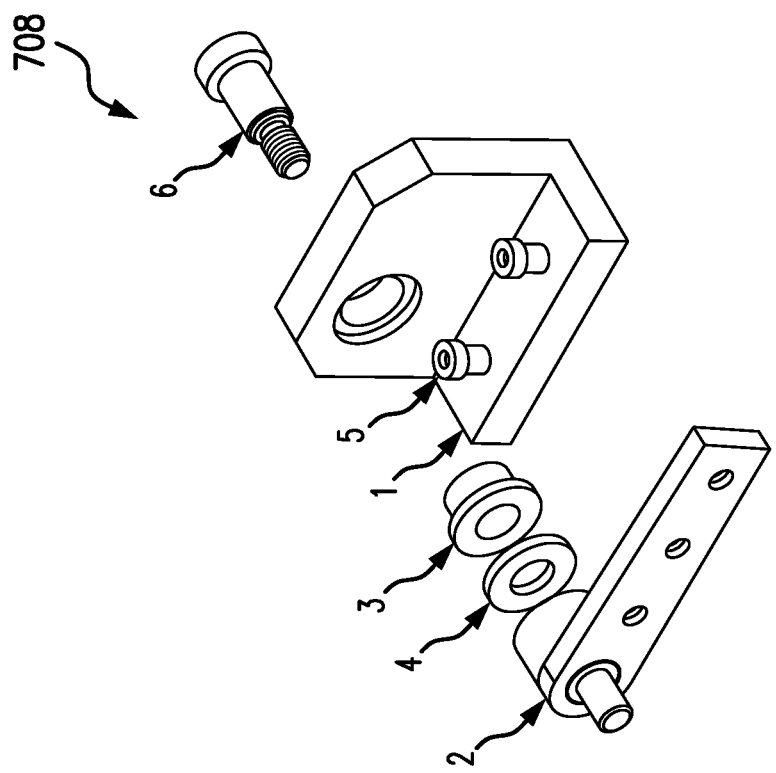
FIG. 7A is an exploded view of a pivoting assembly according to an example of the present invention.

FIGS. 7A and 7B are an exploded view and an assembled view, respectively, showing an example of the pivoting assembly (708) according to the present invention. In this example, the pivoting assembly comprises, consists essentially of, consists of, or includes, a pivot plate (1), a pivot weldment (2), an oil-embedded flanged sleeve bearing (3), an oil-embedded thrust bearing (4), a black oxide steel low profile shoulder screw (5), and an alloy steel shoulder screw (6). In this example, first longitudinal edge (120) of molding template (110) can connect to pivot weldment (2). FIG. 7A shows pieces of a pivoting assembly according to the present invention, and FIG. 7B shows an assembled version of a pivoting assembly.

Preferably, the molding template (710) is joined to pivoting assembly (708) via pivot weldment (2) at the first longitudinal edge of molding (120) (shown in FIG. 1A). This arrangement allows the molding template (110) (shown in FIG. 1A) to rotate around first longitudinal edge (120) (shown in FIG. 1B) at a degree of 175° to 185°, preferably (about) 180°.

In the device of the present invention, holding device (112) is attached to molding template (110) such that, in one configuration as shown in FIG. 6A, holding device (112) is located between molding template (110) and base (102). As an option, in this configuration, holding device (112) is at least partially present in recess (124) seen in FIG. 1C. In another configuration, upon rotation of molding template (110) with the use of pivoting assembly (108), holding device (112) is over the molding template (110) such that molding template (110) is located between holding device (112) and base (102).

Figure 8:
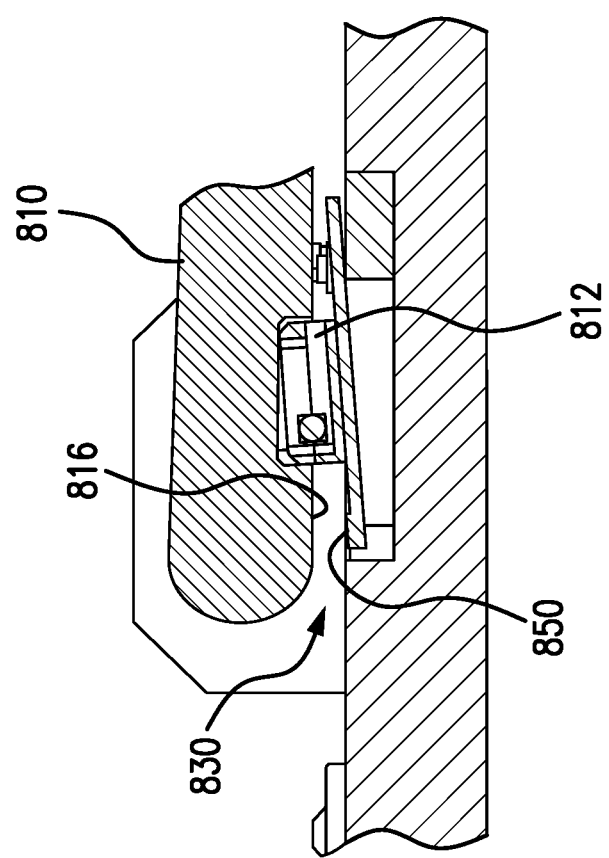
FIG. 8 is a side view in partial cross-section showing parts of the device according to an example of the present invention.

In an example of the present invention, the holding device is an open configuration so that it can receive a first part of a plastic sheet. The plastic sheet can be a PVC sheet, and the plastic sheet is preferably softened so that it can be molded. The plastic sheet can have a softening temperature of, e.g., 35° C. to 180° C. such as from 50° C. to 150° C. or 75° C. to 150° C. More details of the plastic sheet and examples are provided herein. The plastic sheet can be placed onto base (102) and inserted into the holding device (112) in the open configuration at or near room temperature and can then be softened, or it can be softened before being placed on base (102) and inserted into holding device (112). As noted above, the first and second guiderails align the plastic sheet with the holding device that is preferably attached to the molding template. In an example of this configuration, as seen in FIG. 8, a space (830) exists between the first side (816) of molding template (810) and the clamp jaw (850) of holding device (812), where this space is a suitable distance to receive a plastic sheet that is used to form a stair tread. This space or gap can be any distance and is set based on the thickness of the plastic sheet to be molded. For example, this distance can be 0.22 to 0.28 inches (or other sizes below or above this range), which is suitable for receiving a plastic sheet that is 0.23 to 0.25 inches in thickness. Further, in this configuration, the plurality of springs in holding device (112) are in a compressed mode. The gap is a function of the thickness of the product that is being bent to shape.

In another example, the holding device is in a securing configuration where jaw clamp (e.g. 550 in FIG. 5) is pressed against the first part of the plastic sheet with a force sufficient to secure the first part of the plastic sheet against the first side (116) of molding template (110). A transition from the open configuration to the securing configuration can take place by releasing locking mechanism (114) such that molding template (110) is free of the locking mechanism. A release of the locking mechanism (114) can result in releasing tension of the plurality of springs so that the springs are in a released mode. As a result of the releasing of this tension, the pivot of the holding device (e.g. 542 in FIG. 5) rotates so that the clamp jaw (e.g. 550 in FIG. 5) rotates or moves towards the first side of molding template (110) and presses the first part of the plastic sheet against the first side (116) of the molding template, thereby securing the first part of the plastic sheet to the molding template (110).

Once the holding device is in the securing configuration, the molding template (110) can be rotated the 175° to 185° described herein so that the plastic sheet is shaped and formed to a stair tread. During rotation, a portion of the plastic sheet wraps around a curved end of the molding template to form a curved part of the stair tread. Upon rotation of the molding device, a second part of the plastic sheet is in contact with the second surface (e.g. 118 in FIG. 1C) of the molding template (110). In this configuration, the stair tread is now formed, at least in its general shape.

FIGS. 9A-E are various views, including a side view in partial cross-section showing a detailed view of a holding device according to the present invention. FIG. 9A shows an example of the holding device, with FIG. 9B showing a wider version of the holding device having a greater number of springs and attachment means. FIG. 9C shows a profile view of a holding device, illustrating the spring attached to the clamp plate, where the spring is adjacent to the pivot base, pivot axle, and pivot. FIG. 9D shows a front and bottom view of the holding device, and FIG. 9E shows an expanded view of the side-profile of the holding device.

Figure 10:
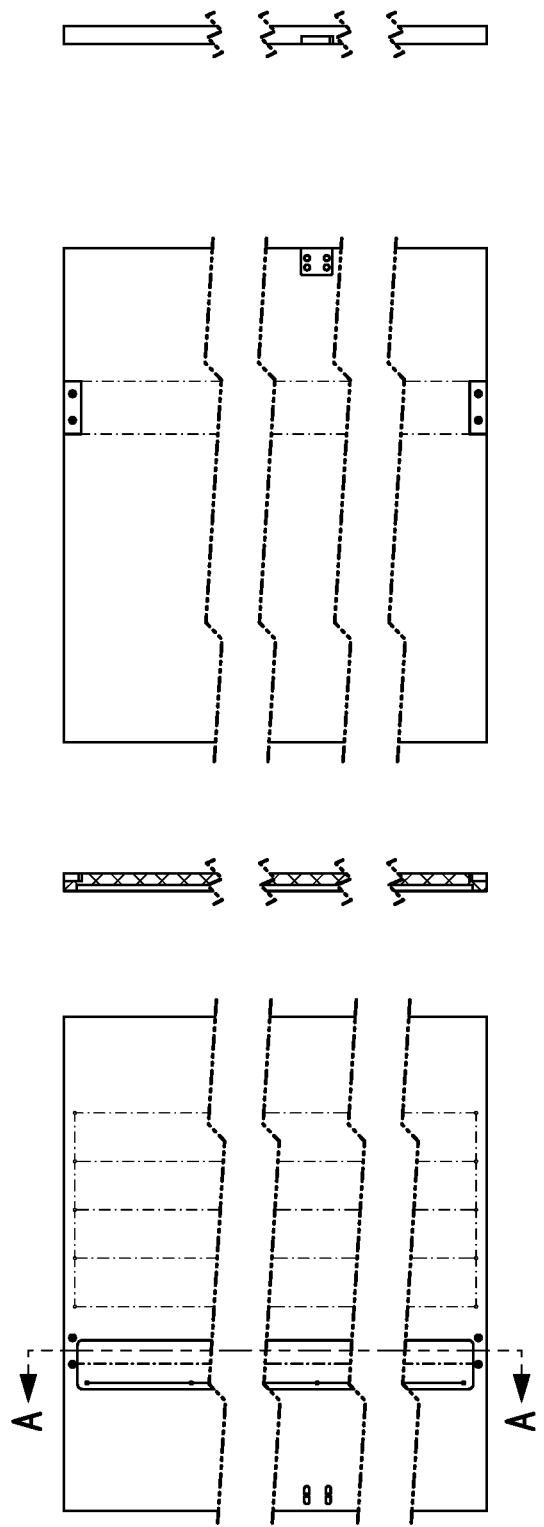
FIG. 10 shows details of a base of the device described herein and details of a molding template described herein.

FIG. 10 shows details of a base of the device described herein and details of a molding template described herein. On the left-hand side, the figure shows details of one example of the base. On the right-hand side, the figure shows details of one example of the molding template.

FIGS. 11A to 11D show a first configuration of the device described herein. In this configuration, the device is able to receive a (softened) plastic sheet to make the stair tread. FIG. 11A shows a top view of the device, along with details of one example of the device. FIG. 11B shows a top, front, end perspective view of this device in the same configuration, showing the locking mechanism holding the molding template in the open configuration. FIG. 11C is a side view of this example of the device, and FIG. 11D shows a front view of the same example of the device.

Figure 12:
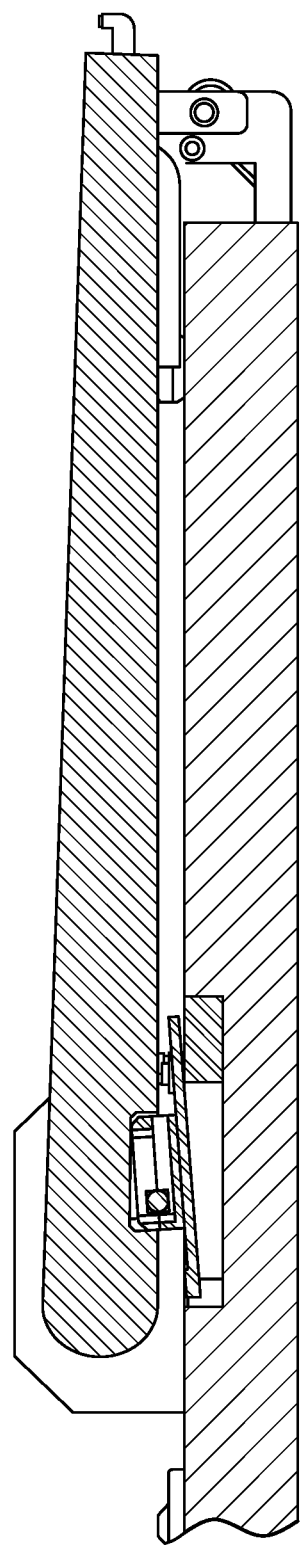
FIG. 12 is a side view in partial cross-section of a first configuration of the molding template described herein.

FIG. 12 is a side view in partial cross-section of a first configuration of the molding template described herein. In this configuration, the molding template is in a configuration that is able to receive the plastic sheet, and the molding template is seen in a configuration prior to the 175° to 185° rotation. The holding device is seen as being attached to the molding template.

FIG. 13A shows a top view of a second configuration of the device described herein. In this configuration, for example, the molding template has been rotated the 175° to 185° described herein. The locking mechanism has been released, allowing for this rotation. FIG. 13B shows a top, front, end perspective view of this configuration. FIG. 13C shows a side view of the device in this configuration, and FIG. 13D shows a front view of the same device in this configuration.

Figure 14:
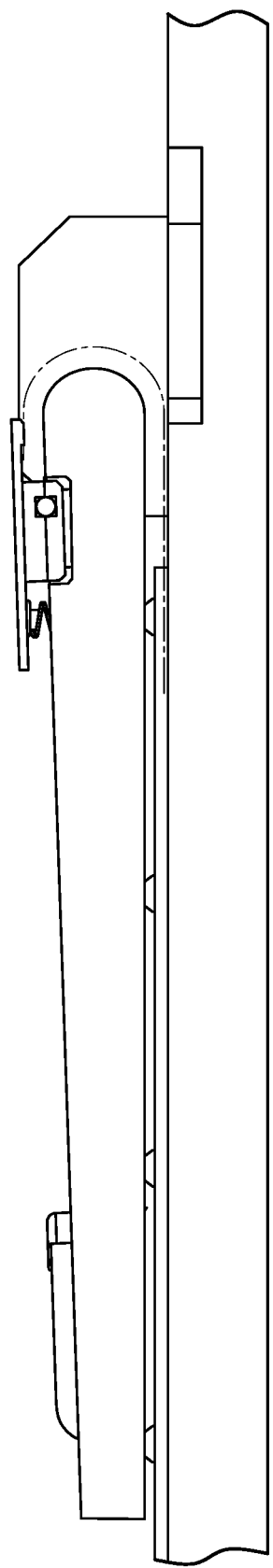
FIG. 14 shows a side view of a second configuration of the molding template described herein.

FIG. 14 shows a side view of a second configuration of the molding template described herein. In this configuration, the molding template is in a configuration where the plastic sheet has been shaped into a stair tread, as the molding template is seen in a configuration after the 175° to 185° rotation. The holding device is seen as being attached to the molding template and above the molding template such that the molding template is between the holding device and the base.

Figure 15:
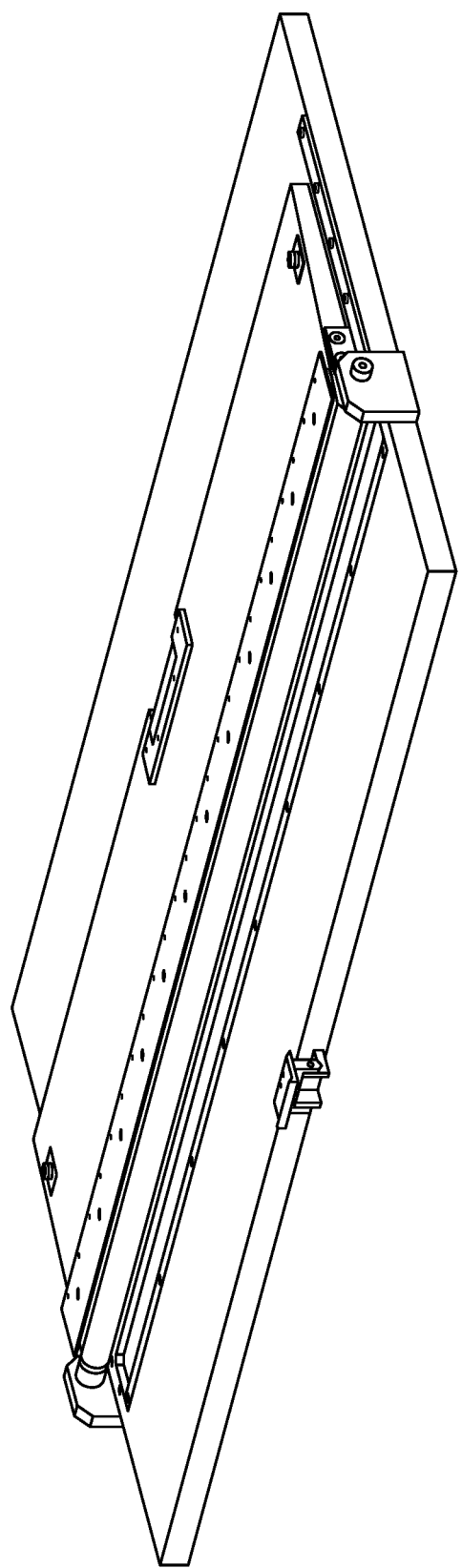
FIG. 15 is a top, front, right perspective view of yet another device as described herein.

FIG. 15 is a top, front, right perspective view showing another device as described herein. The device is in the second configuration, as the molding template is seen in a configuration after the 175° to 185° rotation.

Figure 18:
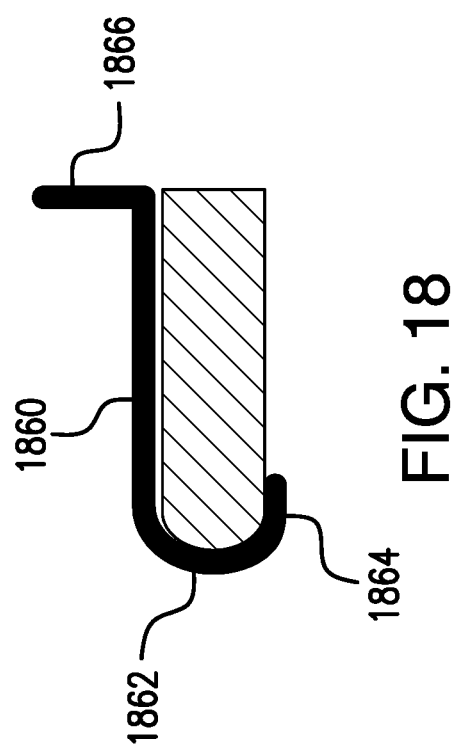
FIG. 18 shows a stair tread according to the present invention.
Figure 19:
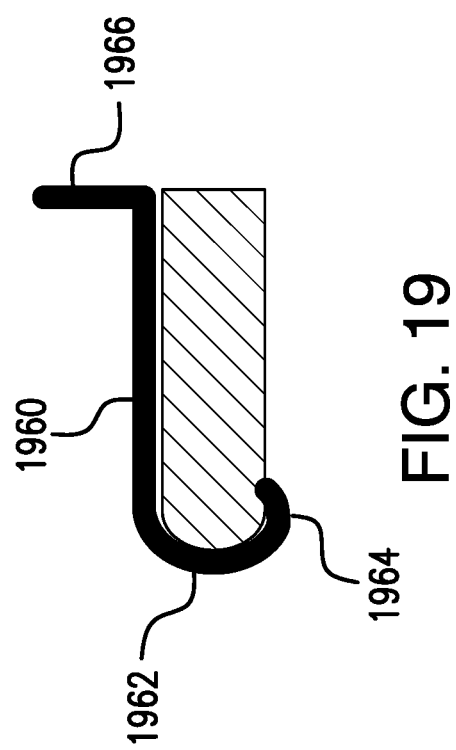
FIG. 19 shows a stair tread according to the present invention.
Figure 16A:
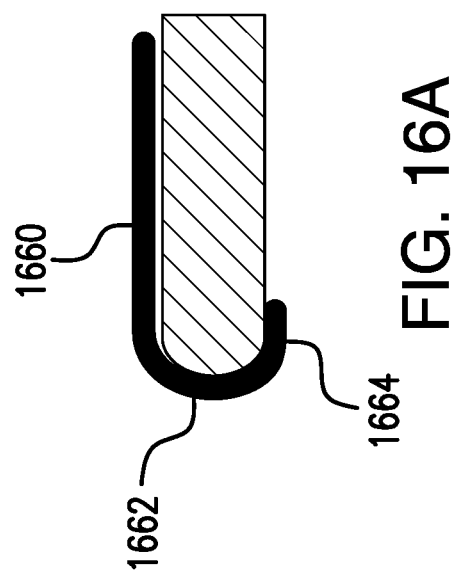
FIGS. 16 A and 16B show a stair tread according to the present invention.
Figure 16B:
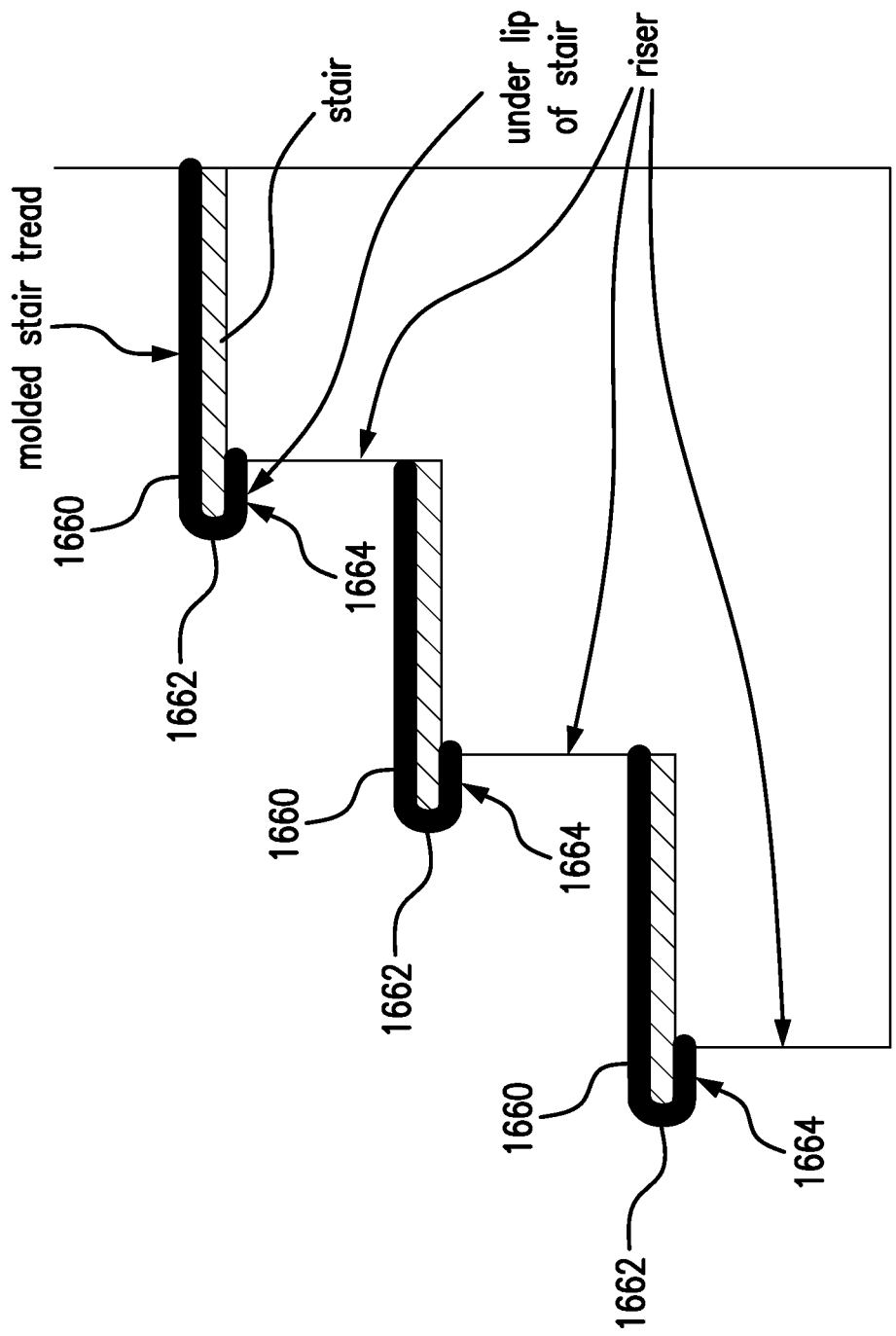

FIGS. 16A, 16B, 17, 18, and 19 show examples of various stair treads obtained by the device and method described herein. In each of these figures, a stair tread of the present invention is shown by the thick bold line whereas a cross-section of the stair on which the stair tread sits can be seen as the object with thin line outline and having the cross-hatched inner section. As seen in FIGS. 16A and 16B, the stair tread has an upper surface (1660), a rounded nose section (1662), and a lower surface (1664). In this example, the upper surface (1660) and the lower surface (1664) are substantially parallel. As used herein, "substantially parallel" includes perfect parallel and a parallel where the upper surface (1660) and the lower surface (1664) are within 3° of parallel. In an alternative aspect, shown in FIG. 17, a round nose section (1762) is shown along with an upper surface (1760). The upper surface (1760) and the lower surface (1764) are not (substantially) parallel but lower surface (1764) is angled inward or upward (e.g., a 1° to 15° angle) toward surface (1760) such that the lower surface (1764) can be crimped or clamped onto the rounded nose section of the stair. FIGS. 18 and 19 have the same features of the aspects seen in FIGS. 16A and 17, respectively, but each of FIGS. 18 and 19 shows a riser or foot stop added to, or part of, the stair tread. Thus, FIG. 18 shows an upper surface (1960), a rounded nose section (1962), and a lower surface (1964), and FIG. 18 shows an upper surface (1960), a rounded nose section (1962), and a lower surface (1964). In each figure, the riser or foot stop is shown as the line extended away from, and substantially perpendicular to, the upper surface of the stair tread, and is seen as item (1866) in FIG. 18 and item (1966) in FIG. 19. As used herein, the term "substantially perpendicular" means that the riser or foot stop and the upper surface forms an angle that is from 87° to 93°.

The riser or foot stop can be generally separate and apart from the stair tread, and it can be added to the adjacent or adjoining stair before, during, or after, the placing of the stair tread on a given stair using the same or similar plastic sheet material used to form the stair tread. In the alternative, the riser or foot stop can be part of the stair tread as a unitary design.

The present invention also includes a method of making a stair tread with the device as described herein. An example of this method is found in a method that comprises, consists essentially of, consists of, or includes inserting a softened plastic sheet into the device described herein; releasing the holding device from the locking mechanism to secure the first part of the softened plastic sheet to the first side of the molding template; and rotating the molding template 175° to 185° around the pivoting assembly, such that a second part of the softened plastic sheet contacts the second side of the molding template, thereby forming the stair tread. The method can further comprise, after said rotating, cooling the softened plastic sheet while the plastic sheet is on the molding template, thereby forming the stair tread in at least its general shape.

In one example of the method, a distance between the first side and the second side of the molding template defines a thickness direction of the molding template, and the first longitudinal edge of the molding template has a rounded shape in the thickness direction of the molding template. Upon cooling of the softened plastic sheet, the resulting stair tread comprises a rounded portion that corresponds to the rounded shape of the molding template at the first longitudinal edge.

In a further example of this method, the holding device comprises a pivot base, a pivot axle, a pivot, a clamp plate, a plurality of springs attached to the clamp base at a first end and the molding template at a second end, and a plurality of screws attached to the pivot, wherein, in the open configuration, the plurality of springs are in a released mode and a space exists between the plurality of screws and the first side of the molding template, and wherein, in the securing configuration, the plurality of springs are in a released mode and the plurality of screws are pressed against the first part of the plastic sheet, thereby securing the first part of the softened plastic sheet to the first side of the molding template.

In a further aspect of the invention, the holding device further comprises a pivot base, a pivot axle, the pivot, a clamp plate, a plurality of springs attached to the clamp base at a first end and attached to the molding template at a second end, and a plurality of attachment means that attach the holding device to molding template, wherein, in an open configuration, the holding device is in a first orientation relative to the molding template, the plurality of springs are in a compressed mode, and a space exists between the clamp jaw and the first side of the molding template, and wherein, in a securing configuration, the holding device is in a second orientation relative to the molding template, the plurality of springs are in a released mode, and the clamp jaw is pressed against the first part of the plastic sheet, thereby securing the first part of the plastic sheet to the first side of the molding template.

The present invention also includes a method of making a stair tread with a device. As an example, the method comprises, consists essentially of, consists of, or includes: aligning a plastic sheet on a base with a holding device using a first guiderail and a second guiderail of the base; inserting a first part of the plastic sheet into a space between a clamp jaw of the holding device and a first side of a molding template; releasing a locking mechanism to release the molding template and the holding device from the locking mechanism, thereby rotating the holding device about a pivot in the holding device such that the clamp jaw clamps the first part of the plastic sheet to the first side of the molding template; and rotating the molding template 175° to 185° around a first longitudinal edge attached to the pivoting assembly, such that a second part of the plastic sheet contacts the second side of the molding template, thereby forming the stair tread, wherein the plastic sheet is a softened plastic sheet that is softened prior to or during said aligning or is softened prior to said inserting.

In a further example of the method, the holding device further comprises a pivot base, a pivot axle, the pivot, a clamp plate, a plurality of springs attached to the clamp base at a first end and attached to the molding template at a second end, and a plurality of attachment means that attach the holding device to molding template. In an open configuration, the holding device is in a first orientation relative to the molding template, the plurality of springs are in a compressed mode, and a space exists between the clamp jaw and the first side of the molding template. Further, in a securing configuration, the holding device is in a second orientation relative to the molding template, the plurality of springs are in a released mode, and the clamp jaw is pressed against the first part of the plastic sheet, thereby securing the first part of the plastic sheet to the first side of the molding template.

In a further example of the method, upon said releasing, the holding device is in the securing configuration and secures the first part of the plastic sheet to the molding template via the clamp jaw.

In a further example of the method, a distance between the first side and a second side of the molding template defines a thickness direction of the molding template, and the first longitudinal edge of the molding template has a rounded shape in the thickness direction of the molding template.

In a further example of the method, the method further comprises, after said rotating cooling the plastic sheet while the plastic sheet is on the molding template. The cooling can take place in any manner sufficient to cool the plastic sheet to a solid, rigid form.

In a further example of the method, upon said cooling, said stair tread cover comprises a rounded portion that corresponds to the rounded shape of the molding template.

The molded stair tread formed can be considered a non-extruded shaped stair tread, meaning that the shape of the stair tread is not formed by extrusion.

Concerning the plastic sheet used in the device and methods of the present invention, the plastic sheet can be any finished, ready-to-use PVC-based or polymeric-based floor material used in flooring that is moldable and can be softened for molding, such as with temperatures of from 50° C. to 180° C. The plastic sheet thus can be a resilient composite sheet structure. The composite sheet can be comprised, for example, of one or more base layers comprising a homogenous blend of polymer material and inorganic filler in resilient sheet form. In another example, the composite sheet can comprised of a laminate structure of diverse material layers including one or more base layers (e.g., two or three or more base layers that can be the same or different with respect to composition and/or physical properties) comprising a homogenous blend of polymer material and inorganic filler. The composite sheet structure can comprise, for example, a luxury vinyl tile (LVT) material, or a luxury vinyl plank (LVP), or a solid vinyl tile (SVT) or a vinyl composition tile (VCT) material. Other resilient polymer-containing composite sheet materials can be used. The LVT material or other flooring or sheet material can include a top layer, which can include at least a printed design and wear layer(s), arranged on top of the base layer or layers. The VCT material can optionally have inlaid surface chips, but typically no wear layer or printed design is overlying the VCT material. The printed design can be present as a separate design layer, can be part of a wear layer or other layer, or can be printed on a layer, such as a base layer or other layer.

The luxury vinyl tile (LVT) can be considered a resilient tile floor covering comprised of polymeric material and a minor amount (<50 wt %) of inorganic filler (based on the total wt % of the LVT). The LVT material can meet the requirements of ASTM F 1700, Class III (Printed Film Vinyl Tile) and/or ASTM F 3261. The LVT material can have a print design or film applied over a base layer(s) or other intermediate layers with a clear (e.g., vinyl or acrylic or urethane or any combination thereof) wear layer(s) on top of the print film. The base layer(s) of LVT can be comprised of polymeric material (or "binder"), fillers, and pigments compounded with suitable lubricants and processing aids. In LVT, the polymeric material can be present in an amount of at least 34 wt % polymeric material (or "binder") comprising, for example, one or more thermoplastic polymers, such as polymers of vinyl chloride, copolymers of vinyl chloride, or both, and other modifying resins, and can include plasticizers. Further, the polymers and copolymers of vinyl chloride can comprise at least 60 wt % of the polymer material, and copolymers of vinyl chloride can comprise at least 85 wt % vinyl chloride.

The vinyl composition tile (VCT) material can be a resilient tile floor covering material comprised of polymeric binder material and inorganic filler in a predominant amount (≥50 wt %) based on the total weight of the VCT. The VCT material can be comprised of polymeric material (or "binder"), fillers, and pigments. The polymeric material can be one or more thermoplastic polymers, such as polymers of vinyl chloride, copolymers of vinyl chloride, or both, compounded with suitable plasticizers and stabilizers. The VCT material can meet requirements of ASTM F 1066. As indicated, the vinyl composition tile material can optionally have an inlaid construction at its upper surface, which does not change the overall thickness of the sheet product. The inlaid process can use, for example, solid colored vinyl chips that are laid on top of a VCT carrier sheet and then bonded together with heat and pressure, such as in conventional manner used for inlaid process.

The plastic sheet can be any polymeric flooring material that has at least one core layer that comprises one or more plastic material(s) or polymer(s) (e.g., thermoplastic polymers such as PVC or copolymers thereof) and can optionally comprise one or more intermediate layers (e.g., other polymer layers, reinforcing layer(s), strengthening layer(s), and the like), and can optionally comprise one or more wear layers and can optionally comprise one or more top layers, and can optionally comprise one or more print or design or décor layers (generally located below the top and/or wear layers). A balancing layer(s) can be utilized and can be located as one of the lower or the bottom-most layers but such a layer(s) is optional. The plastic sheet can optionally be embossed on one or more of the layers, such as the wear and/or top layers, and this embossing can be embossed in register with the print or design that may be present. The plastic sheet can optionally have a tongue and/or groove design on one or more of the edges. The plastic sheet can have no mechanical locking features on any of the edges. The plastic sheet can, as an option, have a pre-applied adhesive protected by a release sheet or layer on the bottom surface of the plastic sheet that, after being formed into a stair tread, can be used to secure on the stair top surface and nosing of the stair.

For purposes of the present invention, the overall plastic sheet has one or more of the following properties: using ASTM D1037 3 Point Static Bending:
Peak Load (lbf) 30 to 100 (e.g., from 40 to 100, or from 50 to 100, or from 60 to 100); and/or Modulus (ksi) 150 to 1200 (e.g., from 250 to 1200, from 400 to 1200, from 600 to 1200, from 700 to 1100); and/or
Stiffness (kPa) 1,000,000 to 7,000,000 (e.g., from 1,250,000 to 7,000,000, from 2,000,000 to 7,000,000, from 3,000,000 to 7,000,000, from 4,000,000 to 7,000,000, from 5,000,000 to 7,000,000). With such one or more of the peak load, modulus and/or stiffness, the ability to mold a curved nose (aka bull nosing or nosing) of the molded stair tread is more possible. The preferred peak load, modulus and/or stiffness (identified above) of the plastic sheet results in a molded stair tread with these preferred peak load, modulus and/or stiffness properties. The plastic sheet as well as the molded stair tread can have the peak load properties or can have the modulus properties, or can have the stiffness properties mentioned here or any combinations thereof. More preferably, all three properties (peak load, modulus and stiffness) are present. One or more than one layer of the plastic sheet or the composite flooring material used to mold into the stair tread can have this desired peak load, modulus and/or stiffness properties.

One design of a plastic sheet or composite flooring material that can be used to form the molded stair tread can be a flooring material (e.g. LVT flooring) that has a backing layer or core material (e.g., PVC with filler such as calcium carbonate) and this flooring material can include one or more resistant layers (e.g., UV-cured polyurethane layer), can include one or more clear layers (e.g., PVC clear layer), and/or can include a print or design or décor layer. This flooring material can be attached, for instance, with adhesive or thermally bonded to a rigid core(s) (e.g., generally containing more filler than the LVT backing layer, such as up to 75 wt % filler and up to 50 wt % PVC or other polymer based on total weight of the rigid core). The rigid core can have a thickness of from 1 mm to 12 mm or more, such as from 3 mm to 6 mm, or 3 mm to 10 mm, or 4 mm to 12 mm. The rigid core can be a highly filled foamed or un-foamed layer. As an option, an acoustic layer (e.g., foam layer or pad) can be attached to the bottom of the rigid core using adhesive or other bonding techniques. This rigid core can have a Peak Load (lbf) 30 to 100 (e.g., from 40 to 100, or from 50 to 100, or from 60 to 100) and/or a Modulus (ksi) 150 to 1200 (e.g., from 250 to 1200, from 400 to 1200, from 600 to 1200, from 700 to 1100) and/or a Stiffness (kPa) 1,000,000 to 7,000,000 (e.g., from 1,250,000 to 7,000,000, from 2,000,000 to 7,000,000, from 3,000,000 to 7,000,000, from 4,000,000 to 7,000,000, from 5,000,000 to 7,000,000).

As an option, instead of using a rigid core, the backing layer of the LVT itself can be more rigid (such as up to 75 wt % filler and/or up to 50 wt % PVC or other polymer based on total weight of this backing layer), and/or contain less than 5 wt % or less than 1 wt % or no plasticizer.

As an option, the rigid core or the backing layer(s) or the overall plastic sheet or flooring contains less than 10 wt % plasticizer such as less than 5 wt % plasticizer, less than 1 wt % plasticizer or 0 wt % plasticizer based on the weight of the rigid core or backing layer or plastic sheet or flooring.

As an option, the overall thickness of the plastic sheet used to form the molded stair tread can be from 1 mm to 12 mm or more, such as from 1 mm to 10 mm, or 1.2 mm to 10 mm or from 1.4 mm to 10 mm or from 2 mm to 10 mm or from 3 mm to 10 mm or from 4 mm to 10 mm or from 5 mm to 10 mm or other thicknesses.

One advantage of the present invention is to be able to match the stair trend design with the flooring used adjacent to or in the same area of the stairs. The present invention permits the ability to take the same flooring material (e.g., have the same décor layer or print layer design) and form the flooring material into a stair tread to match the flooring.

Figure 17:
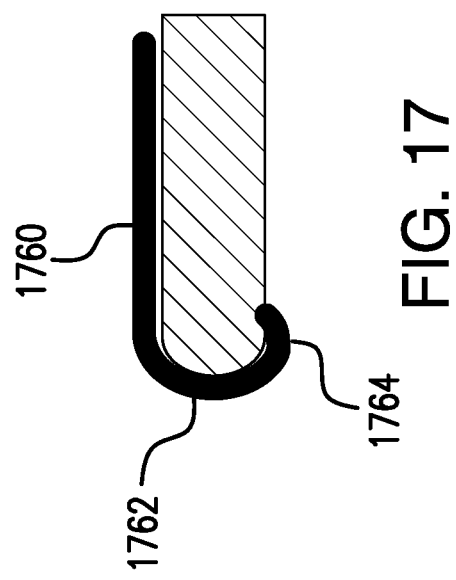
FIG. 17 shows a stair tread according to the present invention.

Another advantage of the present invention is that the curved nose of the molded stair tread can match identically or can be angled one or more degrees inward or upward so that the edge of the molded nose of the stair tread can be optionally concealed from view as one walks on the stair having the stair tread(s). FIG. 16A is a depiction of a design where the nose of the stair tread has no angle upward and FIG. 17 is a depiction of a design where the nose of the stair tread is angled upward, (e.g. at an angle of from 1 to 15 degrees from the surface 1660 or 1760) for instance towards the under edge of the lip of the nose of the actual stair. This curved edge of the molded stair tread can optional touch the under or bottom underneath surface of the nose edge or lip of the stair. FIG. 16B shows a series of stairs with the molded stair tread. Also, with such an angled design, this further permits, as an option, a snap or pressured fit onto the nose of the stair for a more snug fit. As a further option, the molded stair tread can be in the absence of any edge with mechanical locking system or be in the absence of any tongue and/or grove on any edge. As an option, the molded stair tread can be installed on the stair(s) without any nails, and/or without any adhesive, and/or without any mechanical fasteners. As an option, the molded stair tread can be installed by a snug fit (or pressure fit) of the either the nose section and/or the lower surface of the molded stair tread, which as stated, can optionally be angled upward to form a more click or forced or pressured fit against the lip of the stair, as for instance shown in FIG. 17.

The molded stair tread can be secured to the stair tread with any securing means, including, but not limited to, a snap fit, and/or pressure fit, and/or adhesive, and/or nail(s), and/or screw(s) and the like.

The device for making a stair tread can be a manual operated device or a semi-automated device or a fully automated device or a computer-controlled device. The method of making the stair tread as described herein can be achieved manually, or can be achieved in a semi-automated device/method, or can be achieved in a fully automated device/method. For instance, in a semi-automatic or fully automatic device and/or method, electric and/or hydraulic action can be used instead of manual actions to perform or achieve any of the steps described herein, including, but not limited to, one or more of the following: aligning a plastic sheet on the base of the device with the holding device using the first guiderail and the second guiderail of the base; and/or inserting the first part of the plastic sheet into a space between the clamp jaw and the first side of the molding template; and/or releasing the locking mechanism to release the molding template and the holding device from the locking mechanism, thereby rotating the molding template about the pivot of the holding device such that the clamp jaw clamps the first part of the plastic sheet to the first side of the molding template; and/or rotating the molding template 175° to 185° around the first longitudinal edge attached to the pivoting assembly, such that a second part of the plastic sheet contacts the second side of the molding template, thereby forming the stair tread. Further, in a semi-automatic or fully automatic system, computer programs can be used to input settings and/or operations of the device(s).

The present invention includes the following aspects/embodiments/features in any order and/or in any combination:

1. A device for making a stair tread, the device comprising:
    a base;
    a first guide rail on a first longitudinal edge of the base;
    a second guide rail on a second longitudinal edge of the base, the first longitudinal edge and the second longitudinal edge of the base being parallel to each other, and the first guide rail and the second guide rail being configured to accept and align a plastic sheet;
    a pivoting assembly;
    a molding template comprising a first side, a second side, a first longitudinal edge, a second longitudinal edge, a first lateral edge, and a second lateral edge, wherein the first longitudinal edge is perpendicularly aligned to each of the first lateral edge and the second lateral edge, wherein the first longitudinal edge is parallel to the second longitudinal edge, and wherein the first longitudinal edge is connected to the pivoting assembly;
    a holding device connected to the molding template, the holding device comprising a clamp jaw and a pivot configured to rotate the holding device relative to the molding template; and
    a locking mechanism configured to hold the molding template and the holding device in an open configuration such that the holding device can accept a first part of the plastic sheet and configured to release the molding template and the holding device such that the holding device is in a securing configuration that secures, via the clamp jaw, the first part of the plastic sheet to the first side of the molding template at the first longitudinal edge of the molding template.
2. The device according to any preceding or following embodiment/feature/aspect, wherein the holding device further comprises a pivot base, a pivot axle, a pivot, a clamp plate, a plurality of springs attached to the clamp base at a first end and attached to the molding template at a second end, and a plurality of attachment means that attach the holding device to molding template,
    wherein, in the open configuration, the holding device is in a first orientation relative to the molding template, the plurality of springs are in a compressed mode, and a space exists between the clamp jaw and the first side of the molding template, and
    wherein, in the securing configuration, the holding device is in a second orientation relative to the molding template, the plurality of springs are in a released mode, and the clamp jaw is pressed against the first part of the plastic sheet, thereby securing the first part of the plastic sheet to the first side of the molding template.
3. The device according to any preceding or following embodiment/feature/aspect, wherein a distance between the first side and the second side of the molding template defines a thickness direction of the molding template, and wherein the first longitudinal edge of the molding template has a rounded shape in the thickness direction of the molding template.
4. The device according to any preceding or following embodiment/feature/aspect, wherein a distance between the first side and the second side at the first longitudinal edge defines a first thickness of the molding template, wherein a distance between the first side and the second side at the second longitudinal edge defines a second thickness of the molding template, wherein the first thickness is greater than the second thickness, and wherein the first longitudinal edge of the molding template has a rounded shape in the first thickness direction of the molding template.
5. The device according to any preceding or following embodiment/feature/aspect, wherein the molding template has an angle defined by a first projected line that extends in a perpendicular direction from the second longitudinal edge, which connects an upper point of the second longitudinal edge to the first longitudinal edge, and a second projected line that extends from the upper point of the second longitudinal edge to an upper point of the first longitudinal edge, and
    wherein the angle is from 0.5° to 8°.
6. The device according to any preceding or following embodiment/feature/aspect, wherein the angle is from 1° to 5°.
7. The device according to any preceding or following embodiment/feature/aspect, wherein the pivoting assembly is configured to rotate the molding template, around the first longitudinal edge, 175° to 185°.
8. The device according to any preceding or following embodiment/feature/aspect, wherein the molding template is a wooden stair tread.
9. The device according to any preceding or following embodiment/feature/aspect, wherein the rectangular base comprises a recess, wherein the holding device sits in the recess when the holding device is in the open configuration.
10. The device according to any preceding or following embodiment/feature/aspect, wherein the recess is from 0.5 to 1.0 inches in depth.
11. The device according to any preceding or following embodiment/feature/aspect, wherein the recess is from 0.55 to 0.75 inches in depth.
12. The device according to any preceding or following embodiment/feature/aspect, wherein the base further comprises a first lateral edge, and wherein a distance from the first lateral edge to the pivoting assembly is from 15 to 30 inches.
13. The device according to any preceding or following embodiment/feature/aspect, wherein the base further comprises a first lateral edge and a second lateral edge, and wherein a distance from the first lateral edge to the second lateral edge is from 25 to 40 inches.
14. The device according to any preceding or following embodiment/feature/aspect, wherein the base further comprises a rubber stop, and wherein the molding template rests on the rubber stop when the molding template and the holding device are in the open configuration.
15. The device according to any preceding or following embodiment/feature/aspect, wherein a space between the first part of the molding template and the base in a thickness direction is from 0.18 inches to 0.28 inches or other thickness below or above this range.
16. The device according to any preceding or following embodiment/feature/aspect, wherein a space between the first part of the molding template and the base in a thickness direction is from 0.20 inches to 0.25 inches.
17. The device according to any preceding or following embodiment/feature/aspect, wherein the plastic of the plastic sheet is polyvinyl chloride.
18. A method of making a stair tread with the device according to any preceding or following aspect/embodiment/feature, the method comprising:
    aligning a plastic sheet on the base of the device with the holding device using the first guiderail and the second guiderail of the base;

inserting the first part of the plastic sheet into a space between the clamp jaw and the first side of the molding template;

releasing the locking mechanism to release the molding template and the holding device from the locking mechanism, thereby rotating the molding template about the pivot of the holding device such that the clamp jaw clamps the first part of the plastic sheet to the first side of the molding template; and rotating the molding template 175° to 185° around the first longitudinal edge attached to the pivoting assembly, such that a second part of the plastic sheet contacts the second side of the molding template, thereby forming the stair tread, wherein the plastic sheet is a softened plastic sheet that is softened prior to or during said aligning or is softened prior to said inserting.

19. The method according to any preceding or following embodiment/feature/aspect, wherein the holding device further comprises a pivot base, a pivot axle, a pivot, a clamp plate, a plurality of springs attached to the clamp base at a first end and attached to the molding template at a second end, and a plurality of attachment means that attach the holding device to molding template, wherein, in the open configuration, the holding device is in a first orientation relative to the molding template, the plurality of springs are in a compressed mode, and a space exists between the clamp jaw and the first side of the molding template, and wherein, in the securing configuration, the holding device is in a second orientation relative to the molding template, the plurality of springs are in a released mode, and the clamp jaw is pressed against the first part of the plastic sheet, thereby securing the first part of the plastic sheet to the first side of the molding template.

20. The method according to any preceding or following embodiment/feature/aspect, wherein, upon said releasing, the holding device is in the securing configuration and secures the first part of the plastic sheet to the molding template via the clamp jaw.

21. The method according to any preceding or following embodiment/feature/aspect, wherein a distance between the first side and the second side of the molding template defines a thickness direction of the molding template, and wherein the first longitudinal edge of the molding template has a rounded shape in the thickness direction of the molding template.

22. The method according to any preceding or following embodiment/feature/aspect, further comprising, after said rotating:

cooling the plastic sheet while the plastic sheet is on the molding template.

23. The method according to any preceding or following embodiment/feature/aspect, wherein, upon said cooling, said stair tread cover comprises a rounded portion that corresponds to the rounded shape of the molding template.

24. A method of making a stair tread with a device, the method comprising:

aligning a plastic sheet on a base with a holding device using a first guiderail and a second guiderail of the base;

inserting a first part of the plastic sheet into a space between a clamp jaw of the holding device and a first side of a molding template;

releasing a locking mechanism to release the molding template and the holding device from the locking mechanism, thereby rotating the holding device about a pivot in the holding device such that the clamp jaw clamps the first part of the plastic sheet to the first side of the molding template; and rotating the molding template 175° to 185° around a first longitudinal edge attached to the pivoting assembly, such that a second part of the plastic sheet contacts the second side of the molding template, thereby forming the stair tread, wherein the plastic sheet is a softened plastic sheet that is softened prior to or during said aligning or is softened prior to said inserting.

25. The method according to any preceding or following embodiment/feature/aspect, wherein the holding device further comprises a pivot base, a pivot axle, the pivot, a clamp plate, a plurality of springs attached to the clamp base at a first end and attached to the molding template at a second end, and a plurality of attachment means that attach the holding device to molding template, wherein, in an open configuration, the holding device is in a first orientation relative to the molding template, the plurality of springs are in a compressed mode, and a space exists between the clamp jaw and the first side of the molding template, and wherein, in a securing configuration, the holding device is in a second orientation relative to the molding template, the plurality of springs are in a released mode, and the clamp jaw is pressed against the first part of the plastic sheet, thereby securing the first part of the plastic sheet to the first side of the molding template.

26. The method according to any preceding or following embodiment/feature/aspect, wherein, upon said releasing, the holding device is in the securing configuration and secures the first part of the plastic sheet to the molding template via the clamp jaw.

27. The method according to any preceding or following embodiment/feature/aspect, wherein a distance between the first side and a second side of the molding template defines a thickness direction of the molding template, and wherein the first longitudinal edge of the molding template has a rounded shape in the thickness direction of the molding template.

28. The method according to any preceding or following embodiment/feature/aspect, further comprising, after said rotating:

cooling the plastic sheet while the plastic sheet is on the molding template.

29. The method according to any preceding or following embodiment/feature/aspect, wherein, upon said cooling, said stair tread cover comprises a rounded portion that corresponds to the rounded shape of the molding template.

The present invention can include any combination of these various features or embodiments above and/or below as set forth in sentences and/or paragraphs. Any combination of disclosed features herein is considered part of the present invention and no limitation is intended with respect to combinable features.

Unless indicated otherwise, a component described herein can been seen in multiple figures of this application. The number that identifies a component in a particular figure will have a number that corresponds to the figure number, e.g. molding template (110) is seen in FIG. 1A. If another figure shows the molding template, the first number will change but the last two will not, e.g., the molding template of FIG. 2 is molding template (210). Unless otherwise indicated, a component shown in one figure can be the same component shown in another figure and labelled with different numbers in the figures. For example, the molding template (110) of FIG. 1A can be the same as molding template (210) of FIG. 2, and it is possible to refer to molding template (110) in discussing FIG. 2.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range. Further, in this application, a reference to an element by the indefinite article "a" or "an" does not exclude the possibility that more than one of the element or embodiment is present. The definite article "the" can, but not must, refer to a specific element or embodiment.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A device for making a stair tread, the device comprising:
    a base;
    a first guide rail on a first longitudinal edge of the base;
    a second guide rail on a second longitudinal edge of the base, the first longitudinal edge and the second longitudinal edge of the base being parallel to each other, and the first guide rail and the second guide rail being configured to accept and align a plastic sheet;
    a pivoting assembly;
    a molding template comprising a first side, a second side, a first longitudinal edge, a second longitudinal edge, a first lateral edge, and a second lateral edge, wherein the first longitudinal edge is perpendicularly aligned to each of the first lateral edge and the second lateral edge, wherein the first longitudinal edge is parallel to the second longitudinal edge, and wherein the first longitudinal edge is connected to the pivoting assembly;
    a holding device connected to the molding template, the holding device comprising a clamp jaw and a pivot configured to rotate the holding device relative to the molding template; and
    a locking mechanism configured to hold the molding template and the holding device in an open configuration such that the holding device can accept a first part of the plastic sheet and configured to release the molding template and the holding device such that the holding device is in a securing configuration that secures, via the clamp jaw, the first part of the plastic sheet to the first side of the molding template at the first longitudinal edge of the molding template.

2. The device according to claim 1, wherein the holding device further comprises a pivot base, a pivot axle, a pivot, a clamp plate, a plurality of springs attached to the clamp base at a first end and attached to the molding template at a second end, and a plurality of attachment means that attach the holding device to molding template,
    wherein, in the open configuration, the holding device is in a first orientation relative to the molding template, the plurality of springs are in a compressed mode, and a space exists between the clamp jaw and the first side of the molding template, and
    wherein, in the securing configuration, the holding device is in a second orientation relative to the molding template, the plurality of springs are in a released mode, and the clamp jaw is pressed against the first part of the plastic sheet, thereby securing the first part of the plastic sheet to the first side of the molding template.

3. The device according to claim 1, wherein a distance between the first side and the second side of the molding template defines a thickness direction of the molding template, and wherein the first longitudinal edge of the molding template has a rounded shape in the thickness direction of the molding template.

4. The device according to claim 1, wherein a distance between the first side and the second side at the first longitudinal edge defines a first thickness of the molding template, wherein a distance between the first side and the second side at the second longitudinal edge defines a second thickness of the molding template, wherein the first thickness is greater than the second thickness, and wherein the first longitudinal edge of the molding template has a rounded shape in the first thickness direction of the molding template.

5. The device according to claim 4, wherein the molding template has an angle defined by a first projected line that extends in a perpendicular direction from the second longitudinal edge, which connects an upper point of the second longitudinal edge to the first longitudinal edge, and a second projected line that extends from the upper point of the second longitudinal edge to an upper point of the first longitudinal edge, and
    wherein the angle is from 0.5° to 8°.

6. The device according to claim 1, wherein the pivoting assembly is configured to rotate the molding template, around the first longitudinal edge, 175° to 185°.

7. The device according to claim 1, wherein the molding template is a wooden stair tread.

8. The device according to claim 1, wherein the plastic of the plastic sheet is polyvinyl chloride.

9. A method of making a stair tread with a device, the device comprising:
    a base;
    a first guide rail on a first longitudinal edge of the base;
    a second guide rail on a second longitudinal edge of the base, the first longitudinal edge and the second longitudinal edge of the base being parallel to each other, and the first guide rail and the second guide rail being configured to accept and align a plastic sheet;
    a pivoting assembly;
    a molding template comprising a first side, a second side, a first longitudinal edge, a second longitudinal edge, a first lateral edge, and a second lateral edge, wherein the first longitudinal edge is perpendicularly aligned to each of the first lateral edge and the second lateral edge, wherein the first longitudinal edge is parallel to the second longitudinal edge, and wherein the first longitudinal edge is connected to the pivoting assembly;
    a holding device connected to the molding template, the holding device comprising a clamp jaw and a pivot configured to rotate the holding device relative to the molding template; and a locking mechanism configured to hold the molding template and the holding device in an open configuration such that the holding device can accept a first part of the plastic sheet and configured to release the molding template and the holding device such that the holding device is in a securing configuration that secures, via the clamp jaw, the first part of the plastic sheet to the first side of the molding template at the first longitudinal edge of the molding template, aligning a plastic sheet on the base of the device with the holding device using the first guiderail and the second guiderail of the base;

inserting the first part of the plastic sheet into a space between the clamp jaw and the first side of the molding template;

releasing the locking mechanism to release the molding template and the holding device from the locking mechanism, thereby rotating the molding template about the pivot of the holding device such that the clamp jaw clamps the first part of the plastic sheet to the first side of the molding template; and rotating the molding template 175° to 185° around the first longitudinal edge attached to the pivoting assembly, such that a second part of the plastic sheet contacts the second side of the molding template, thereby forming the stair tread, wherein the plastic sheet is a softened plastic sheet that is softened prior to or during said aligning or is softened prior to said inserting.

10. A method of making a stair tread with a device, the method comprising:

aligning a plastic sheet on a base with a holding device using a first guiderail and a second guiderail of the base;

inserting a first part of the plastic sheet into a space between a clamp jaw of the holding device and a first side of a molding template;

releasing a locking mechanism to release the molding template and the holding device from the locking mechanism, thereby rotating the holding device about a pivot in the holding device such that the clamp jaw clamps the first part of the plastic sheet to the first side of the molding template; and rotating the molding template 175° to 185° around a first longitudinal edge attached to the pivoting assembly, such that a second part of the plastic sheet contacts the second side of the molding template, thereby forming the stair tread, wherein the plastic sheet is a softened plastic sheet that is softened prior to or during said aligning or is softened prior to said inserting.

11. The method according to claim 10, wherein the holding device further comprises a pivot base, a pivot axle, the pivot, a clamp plate, a plurality of springs attached to the clamp base at a first end and attached to the molding template at a second end, and a plurality of attachment means that attach the holding device to molding template, wherein, in an open configuration, the holding device is in a first orientation relative to the molding template, the plurality of springs are in a compressed mode, and a space exists between the clamp jaw and the first side of the molding template, and wherein, in a securing configuration, the holding device is in a second orientation relative to the molding template, the plurality of springs are in a released mode, and the clamp jaw is pressed against the first part of the plastic sheet, thereby securing the first part of the plastic sheet to the first side of the molding template.

12. The method according to claim 11, wherein, upon said releasing, the holding device is in the securing configuration and secures the first part of the plastic sheet to the molding template via the clamp jaw.

13. The method according to claim 10, wherein a distance between the first side and a second side of the molding template defines a thickness direction of the molding template, and wherein the first longitudinal edge of the molding template has a rounded shape in the thickness direction of the molding template.

14. The method according to claim 13, further comprising, after said rotating:

cooling the plastic sheet while the plastic sheet is on the molding template.

15. The method according to claim 14, wherein, upon said cooling, said stair tread cover comprises a rounded portion that corresponds to the rounded shape of the molding template.

* * * * *

UNITED STATES PATENT AND TRADEMARK OFFICE
CERTIFICATE OF CORRECTION

| | | |
|---|---|---|
| PATENT NO. | : 11,332,941 B2 | Page 1 of 1 |
| APPLICATION NO. | : 16/908766 | |
| DATED | : May 17, 2022 | |
| INVENTOR(S) | : Bodendorf et al. | |

It is certified that error appears in the above-identified patent and that said Letters Patent is hereby corrected as shown below:

In the Claims

Claim 9, Column 21, after Line 9, add the following:
-- the method comprising: --

Signed and Sealed this
Twenty-first Day of June, 2022

Katherine Kelly Vidal
*Director of the United States Patent and Trademark Office*